United States Patent
Fleming

(10) Patent No.: US 7,562,507 B2
(45) Date of Patent: Jul. 21, 2009

(54) VACUUM INSULATED BUILDING PANEL

(76) Inventor: Wallace E. Fleming, Suite 1005, 10160 - 116 Street, Edmonton, Alberta (CA) T5K 1V9

( * ) Notice: Subject to any disclaimer, the term of this patent is extended or adjusted under 35 U.S.C. 154(b) by 250 days.

(21) Appl. No.: 10/599,316

(22) PCT Filed: Apr. 1, 2005

(86) PCT No.: PCT/CA2005/000645

§ 371 (c)(1), (2), (4) Date: Sep. 25, 2006

(87) PCT Pub. No.: WO2005/098156

PCT Pub. Date: Oct. 20, 2005

(65) Prior Publication Data

US 2008/0236052 A1    Oct. 2, 2008

(30) Foreign Application Priority Data

Apr. 8, 2004    (CA) ................................. 2460477

(51) Int. Cl.
    *E04C 2/32* (2006.01)
(52) U.S. Cl. .................. 52/788.1; 52/795.1; 52/784.16; 52/793.11; 428/69
(58) Field of Classification Search ................ 52/788.1, 52/795.1, 784.16, 793.11, 660, 663, 664, 52/281, 284, 784.14, 787.11, 794.1; 53/432–434, 53/510–512; 141/8, 65; 428/69
    See application file for complete search history.

(56) References Cited

U.S. PATENT DOCUMENTS

| 948,541 | A | | 2/1910 | Coleman |
| 2,104,500 | A | * | 1/1938 | Van Buren ................. 52/220.1 |
| 2,511,620 | A | * | 6/1950 | Clements ...................... 52/214 |
| 2,662,043 | A | * | 12/1953 | Clements .................... 428/120 |
| 3,675,382 | A | * | 7/1972 | Lickliter et al. ............... 52/214 |
| 4,423,579 | A | * | 1/1984 | Dyar ......................... 52/407.2 |
| 4,579,756 | A | | 4/1986 | Edgel |
| 5,168,674 | A | | 12/1992 | Molthen |
| 5,175,975 | A | * | 1/1993 | Benson et al. ............. 52/788.1 |
| 5,875,599 | A | * | 3/1999 | McGrath et al. ........... 52/586.2 |
| 6,085,469 | A | * | 7/2000 | Wolfe ............................. 52/71 |
| 2004/0128947 | A1 | * | 7/2004 | Ito et al. ..................... 52/782.1 |

* cited by examiner

*Primary Examiner*—Brian E. Glessner
*Assistant Examiner*—James J Buckle, Jr.
(74) *Attorney, Agent, or Firm*—Donald V. Tomkins

(57) ABSTRACT

The present invention relates to vacuum insulated building panels. The insulating building panel of this invention uses suction pressure created by a vacuum as the sole means of attachments between two parallel steel (10) or glass (12) panel plates and a post frame (14). When vacuum is applied, the plates engage the post frame in an airtight manner and spheres (112) are used as spacers to maintain separation of the plates and they roll without resistance to accommodate any movement of one plate in relation to the other. These features of the building panel eliminate warping which is caused by expansion or contraction of weather exposed faces of the panel plates due to fluctuating outside temperatures and also eliminate stress upon support structures.

8 Claims, 21 Drawing Sheets

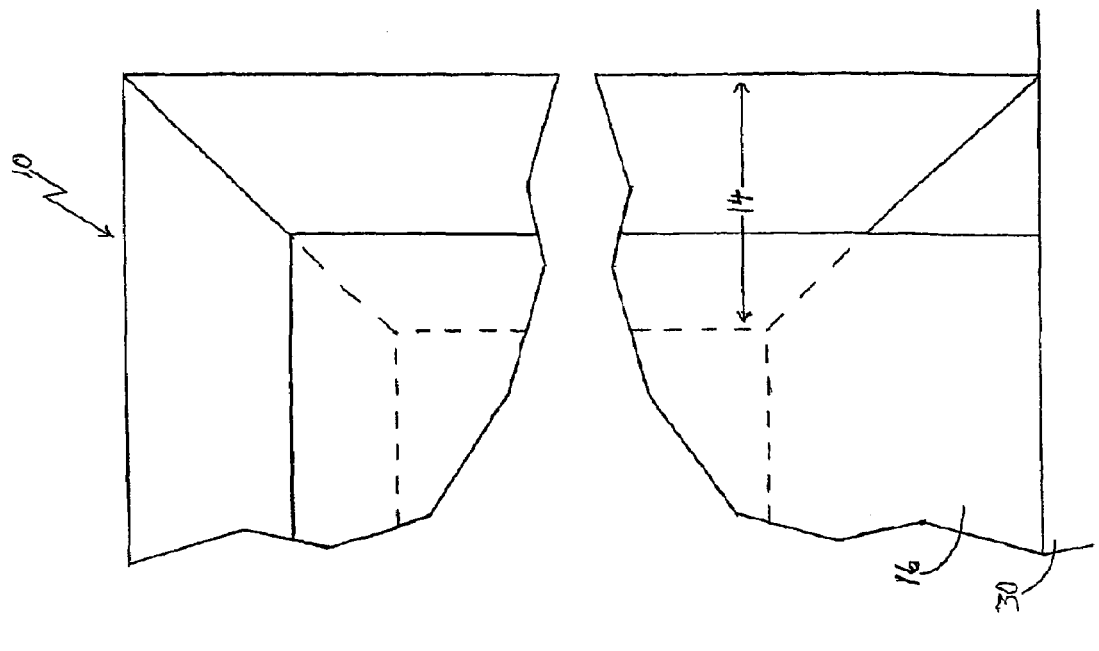
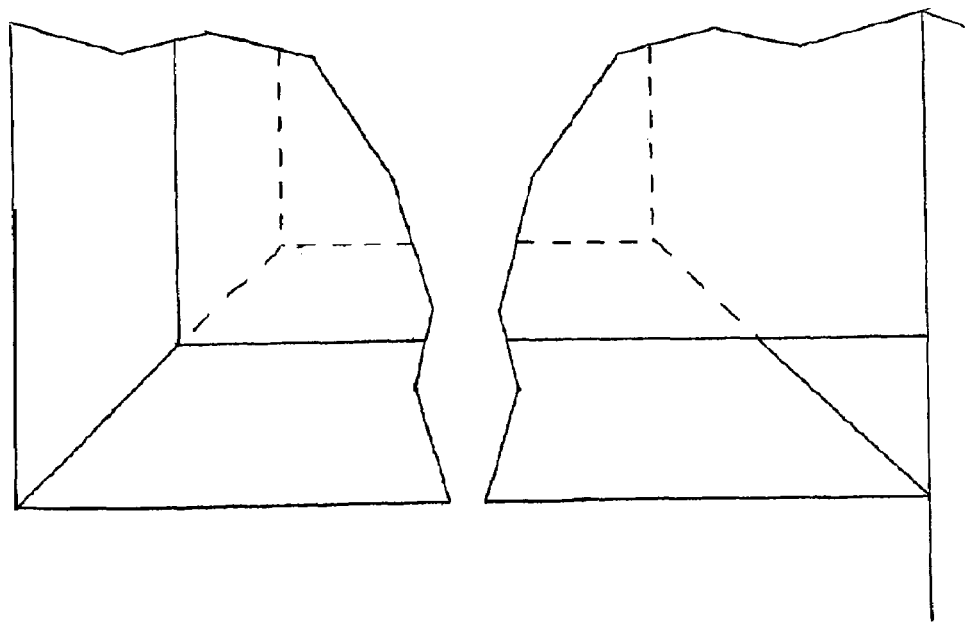
Fig. 2  Full scale.

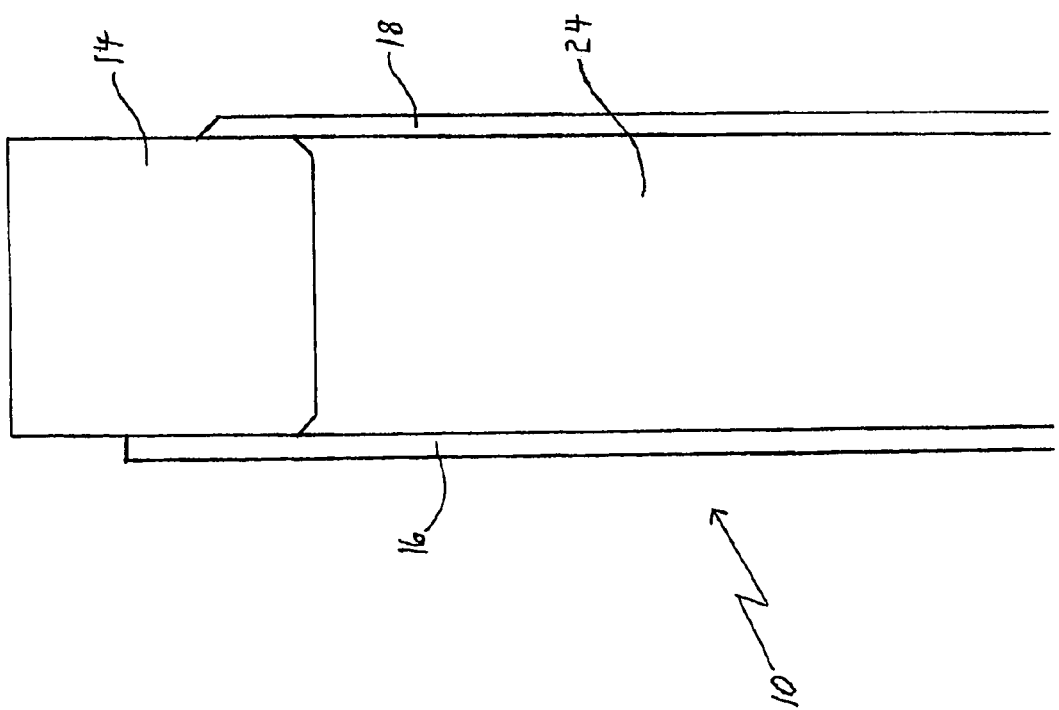
Fig. 3  Full scale.

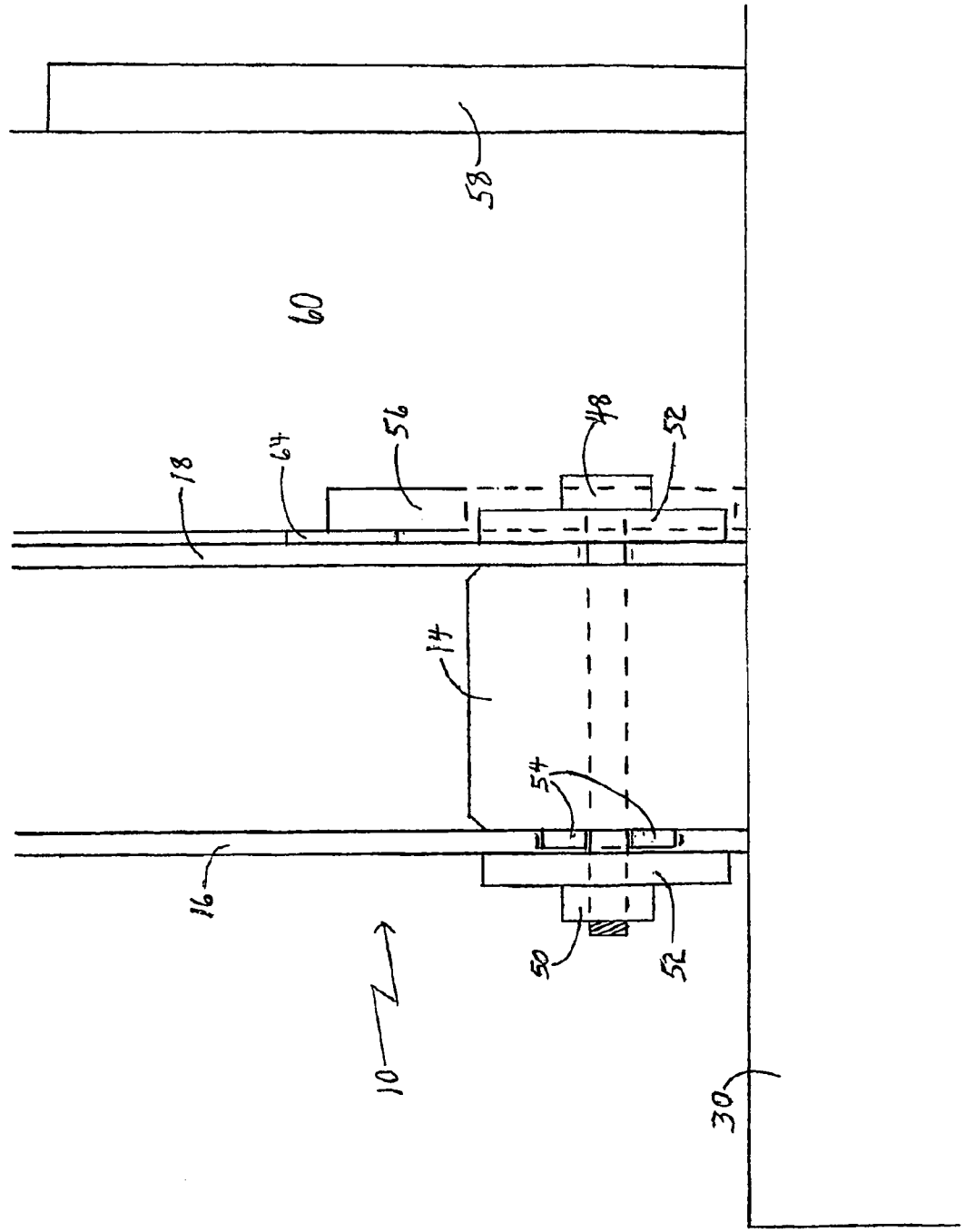
Fig. 4  Full scale.

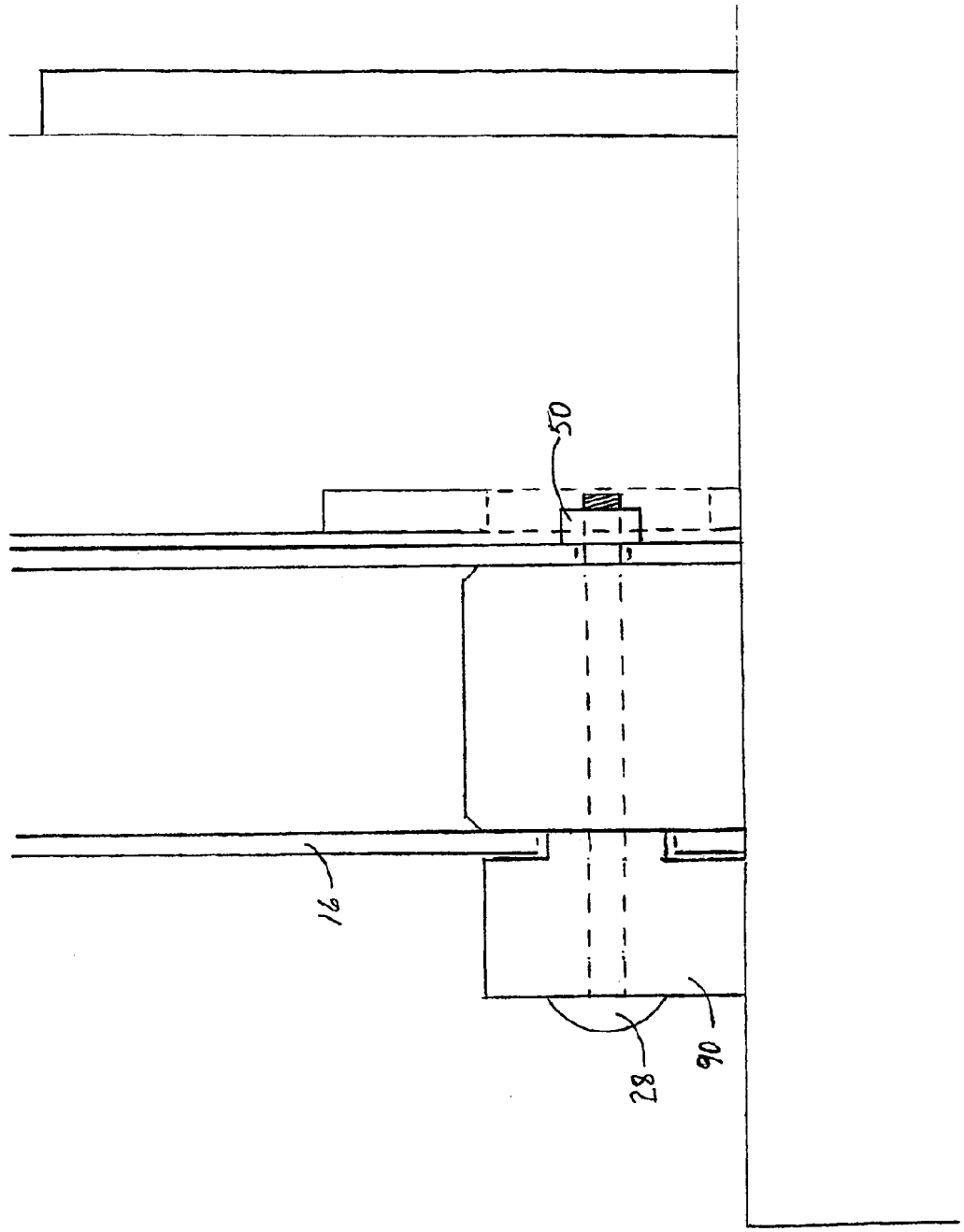
Fig. 5    Full scale.

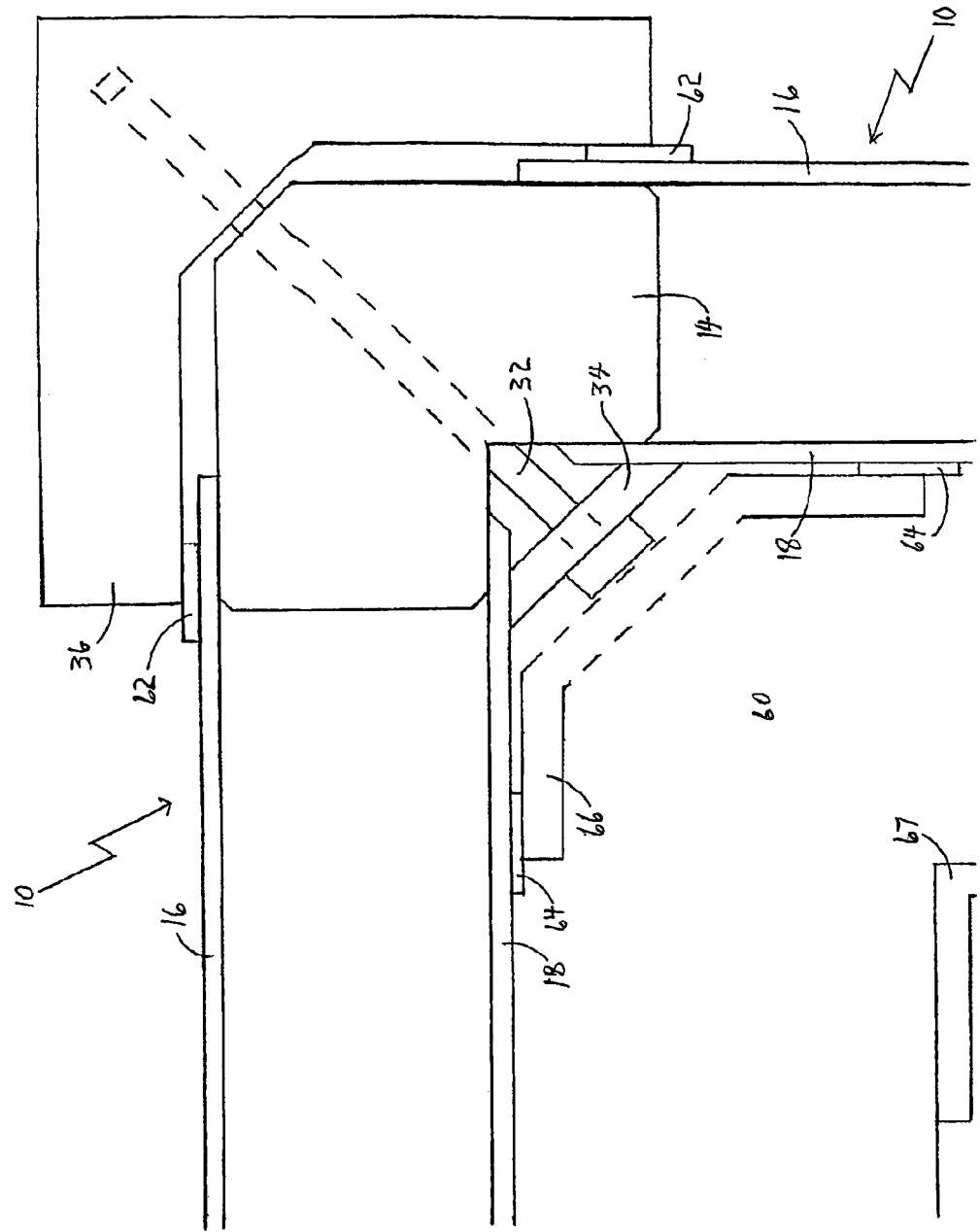
Fig. 6  Full scale.

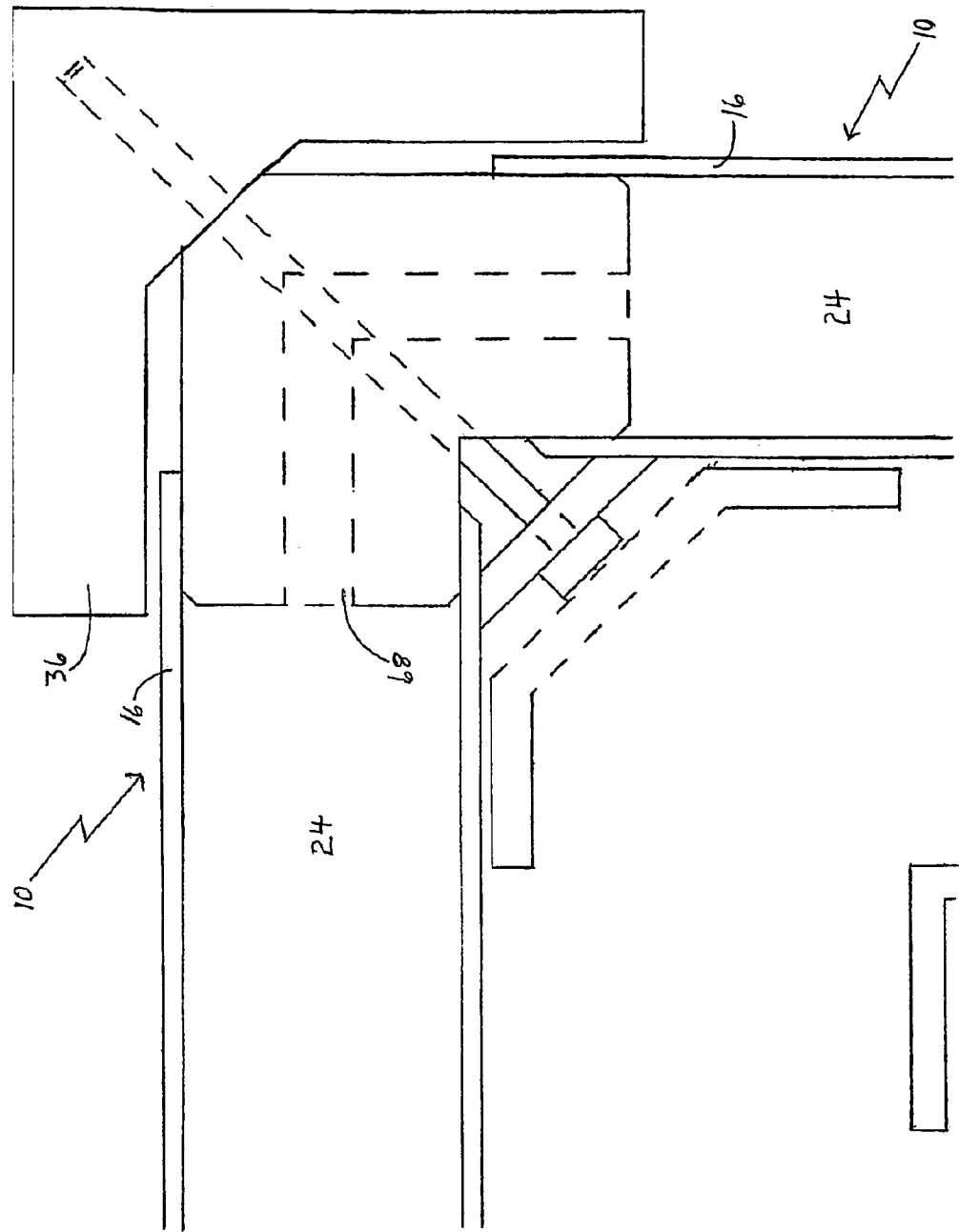
Fig. 7    Full scale.

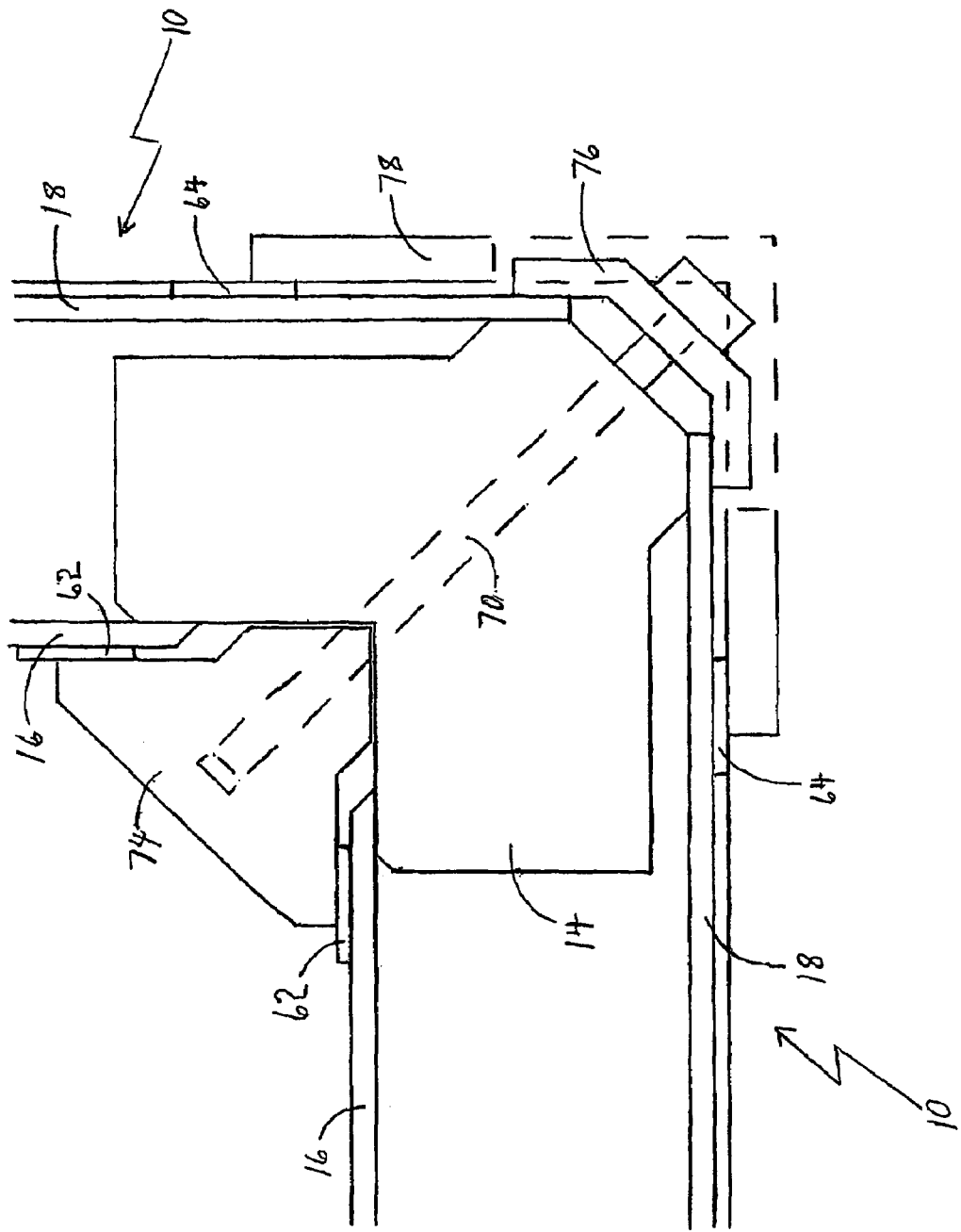
Fig. 8  Full scale.

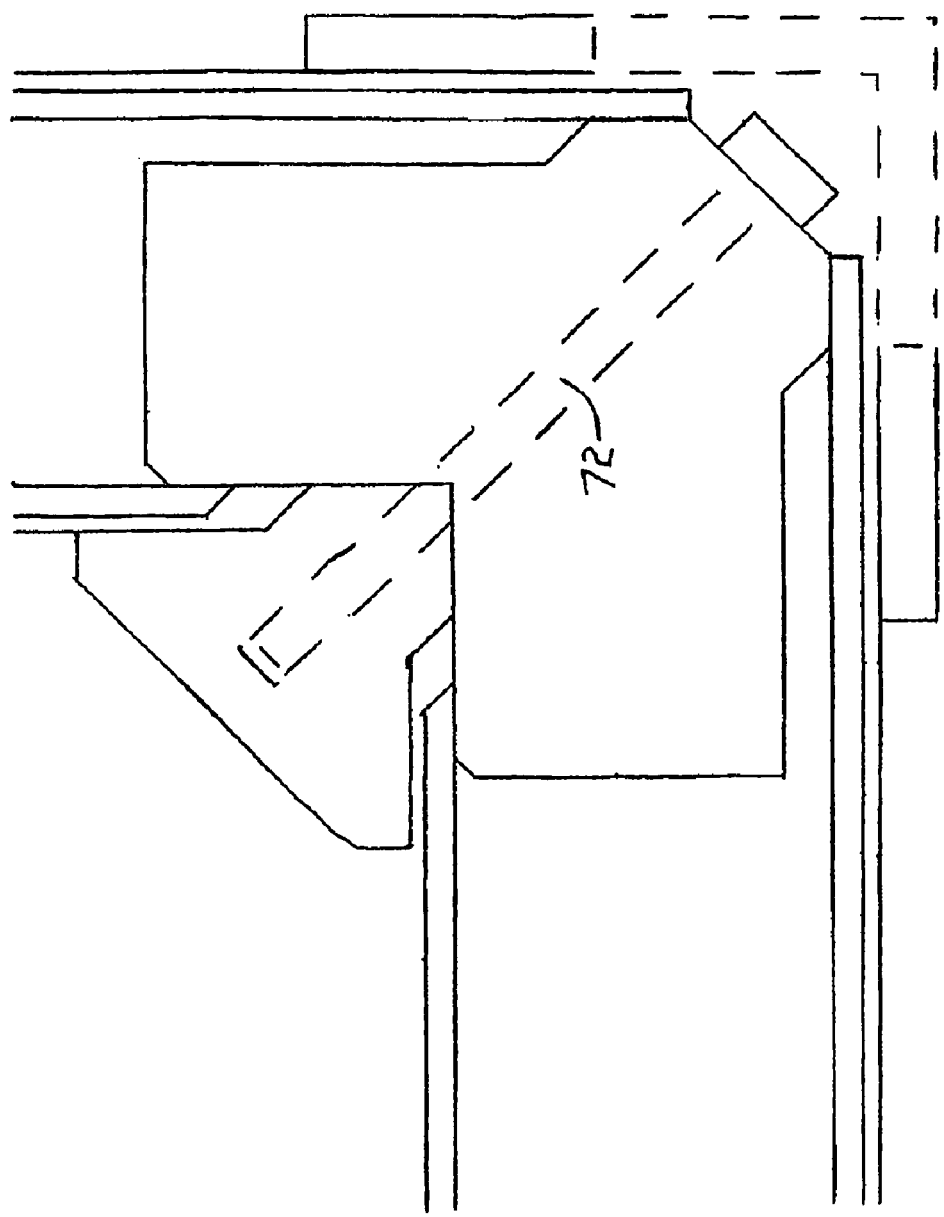
Fig. 9  Full scale.

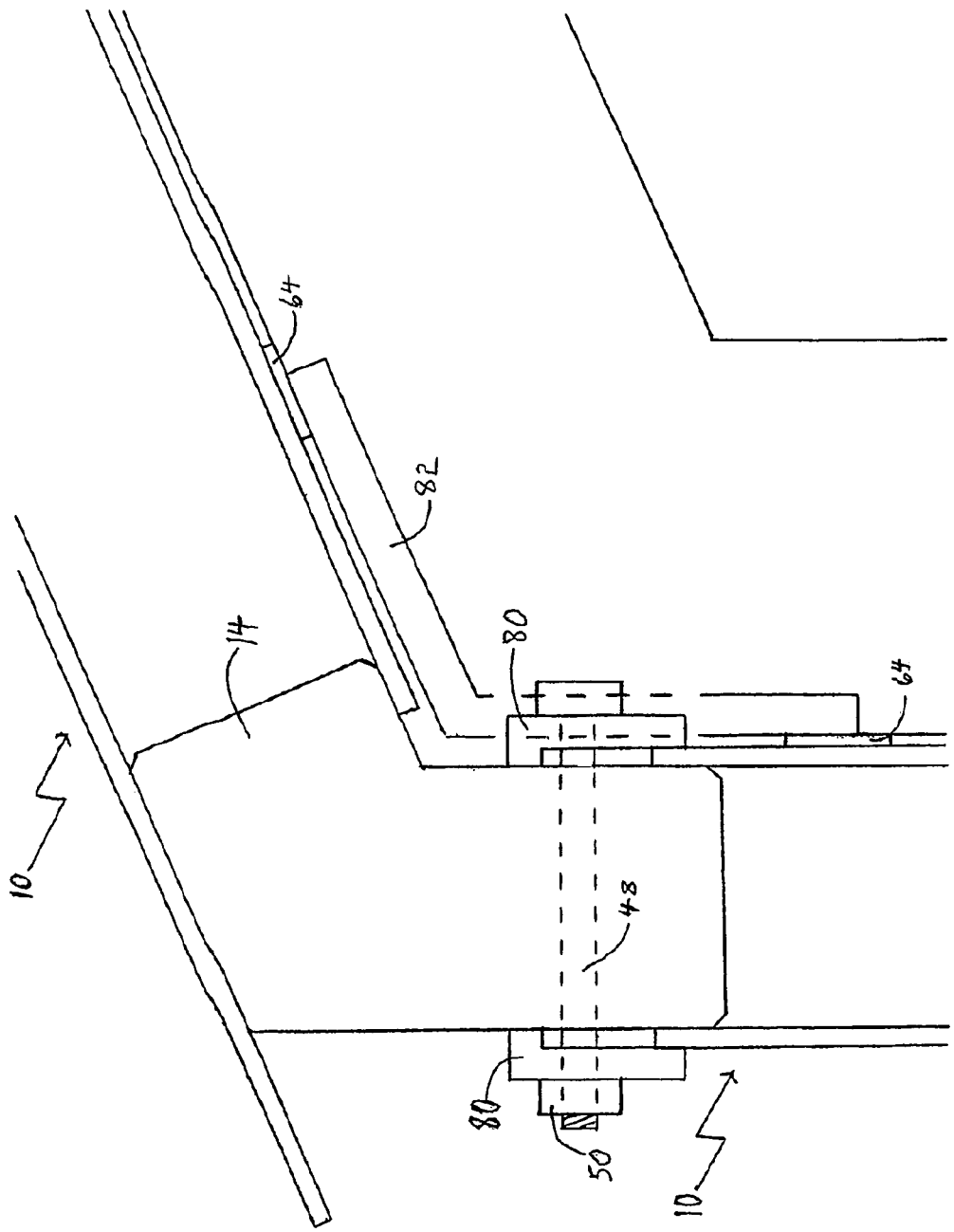

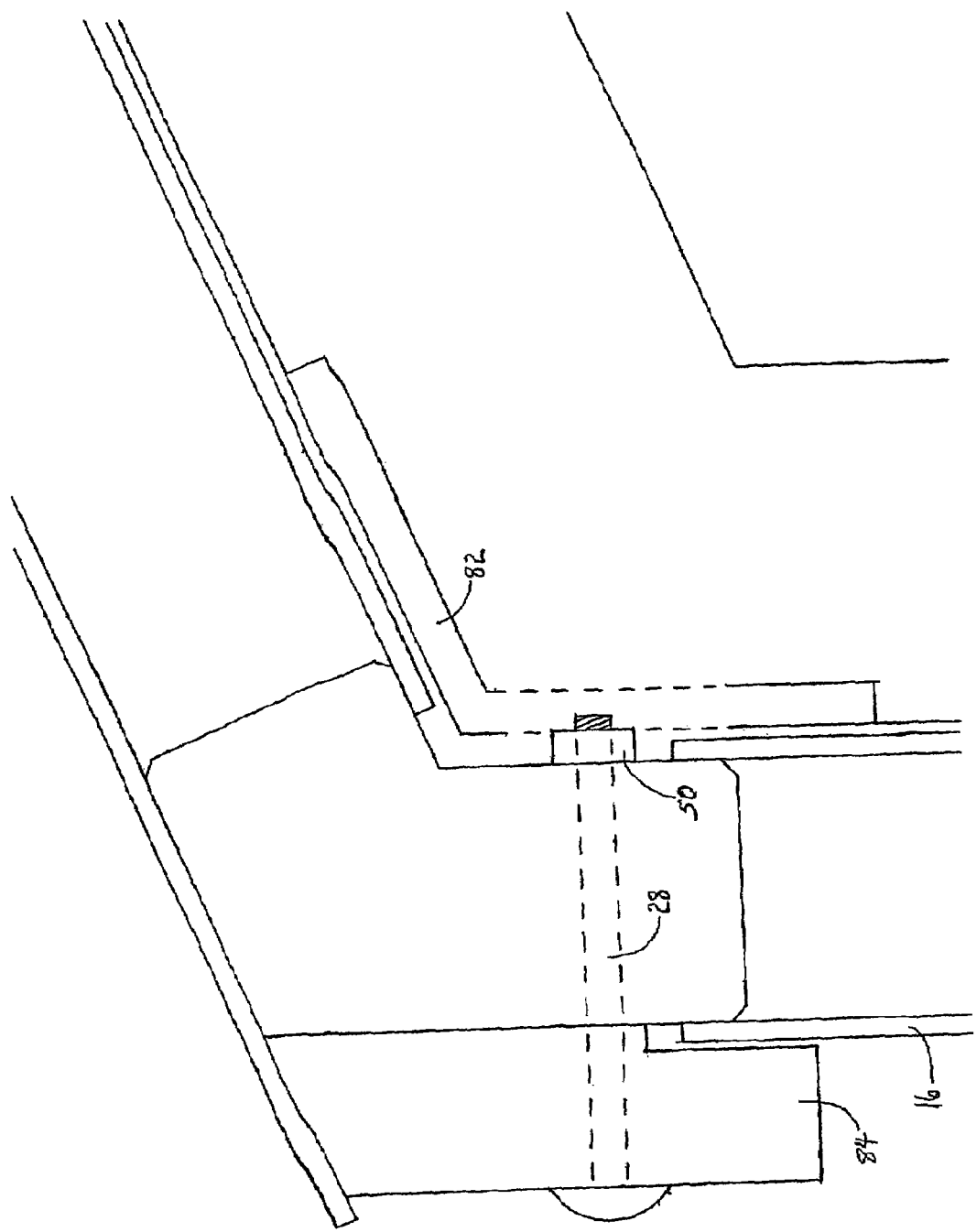
Fig. 11  Full scale.

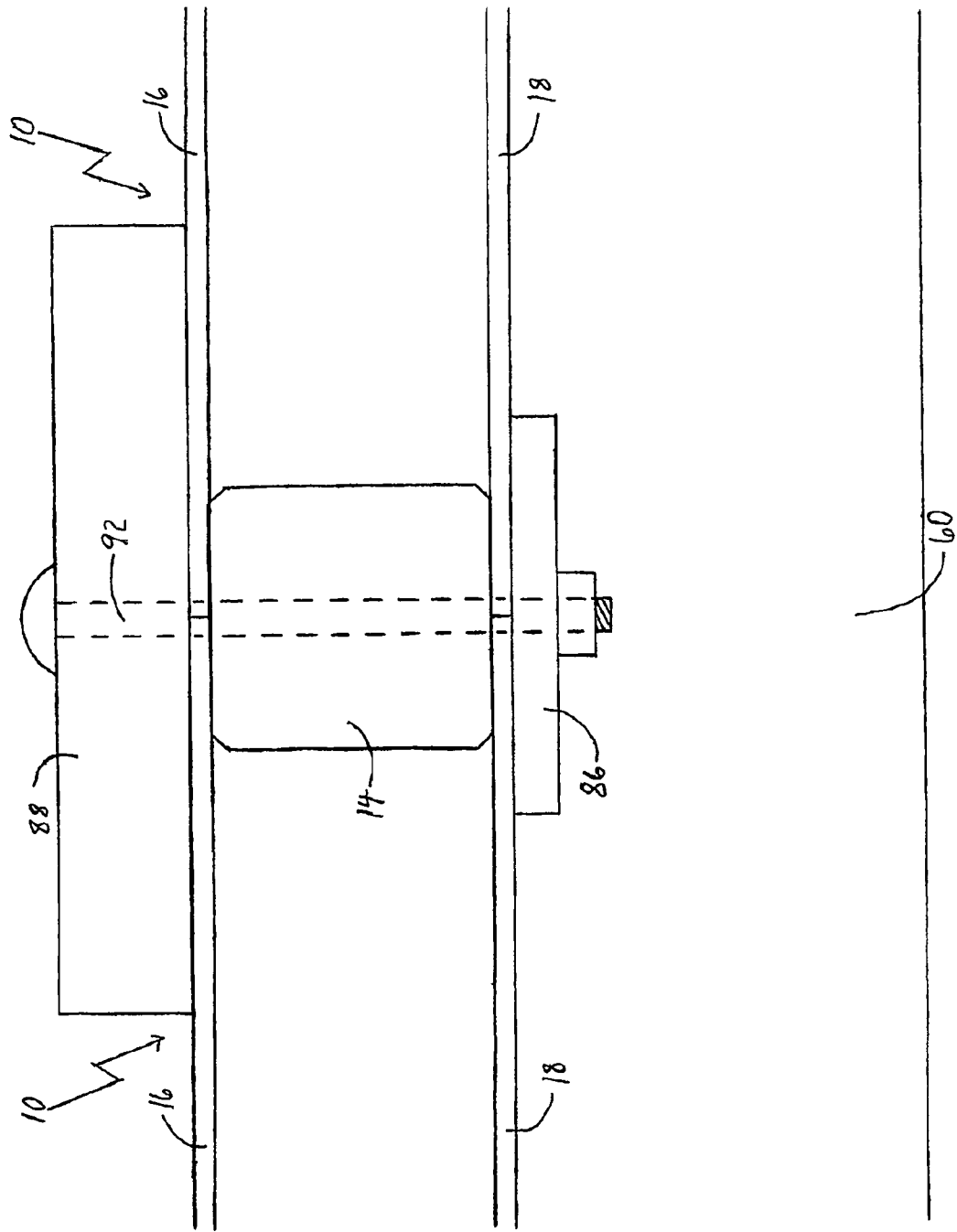
Fig. 12  Full scale.

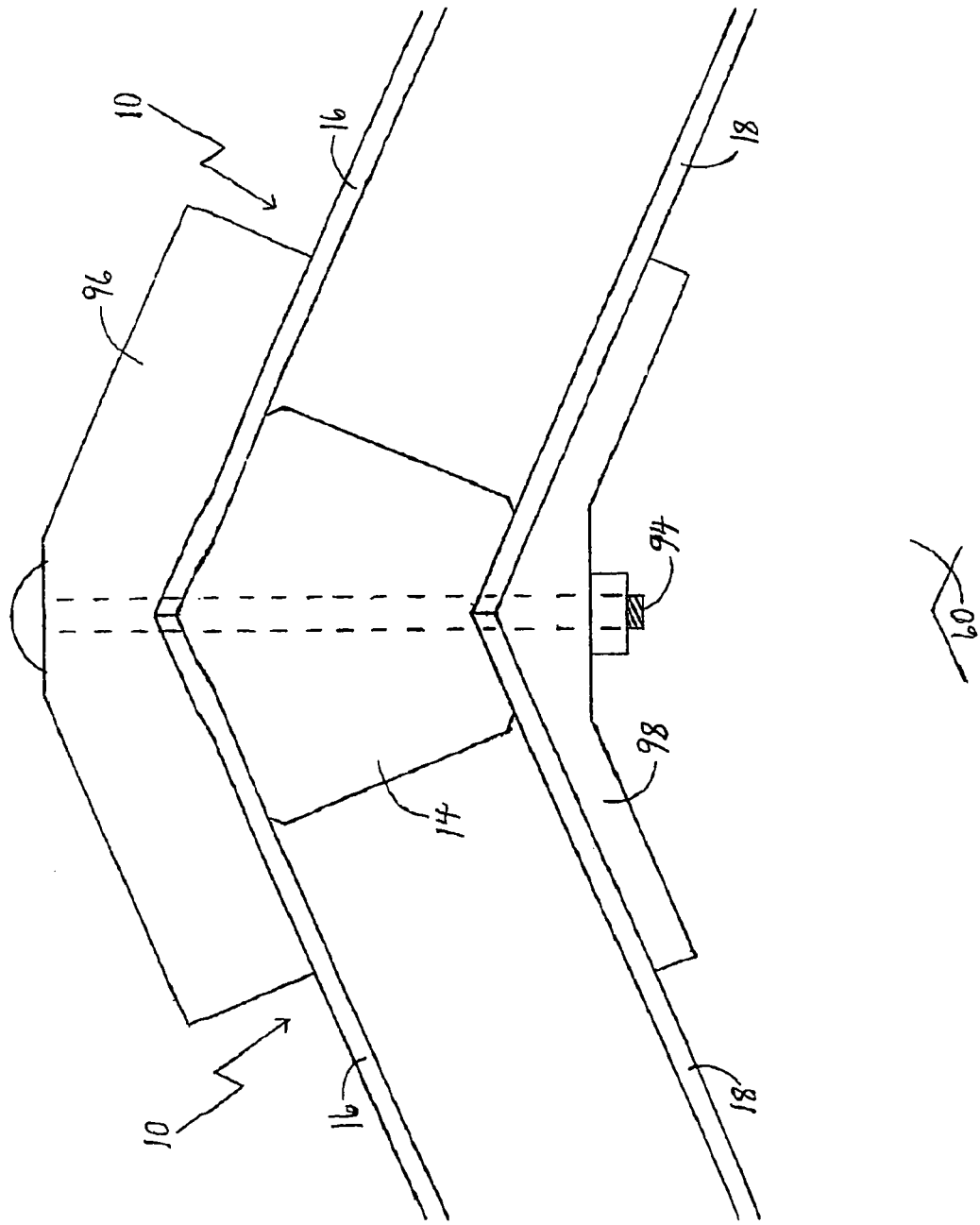
Fig. 13  Full scale.

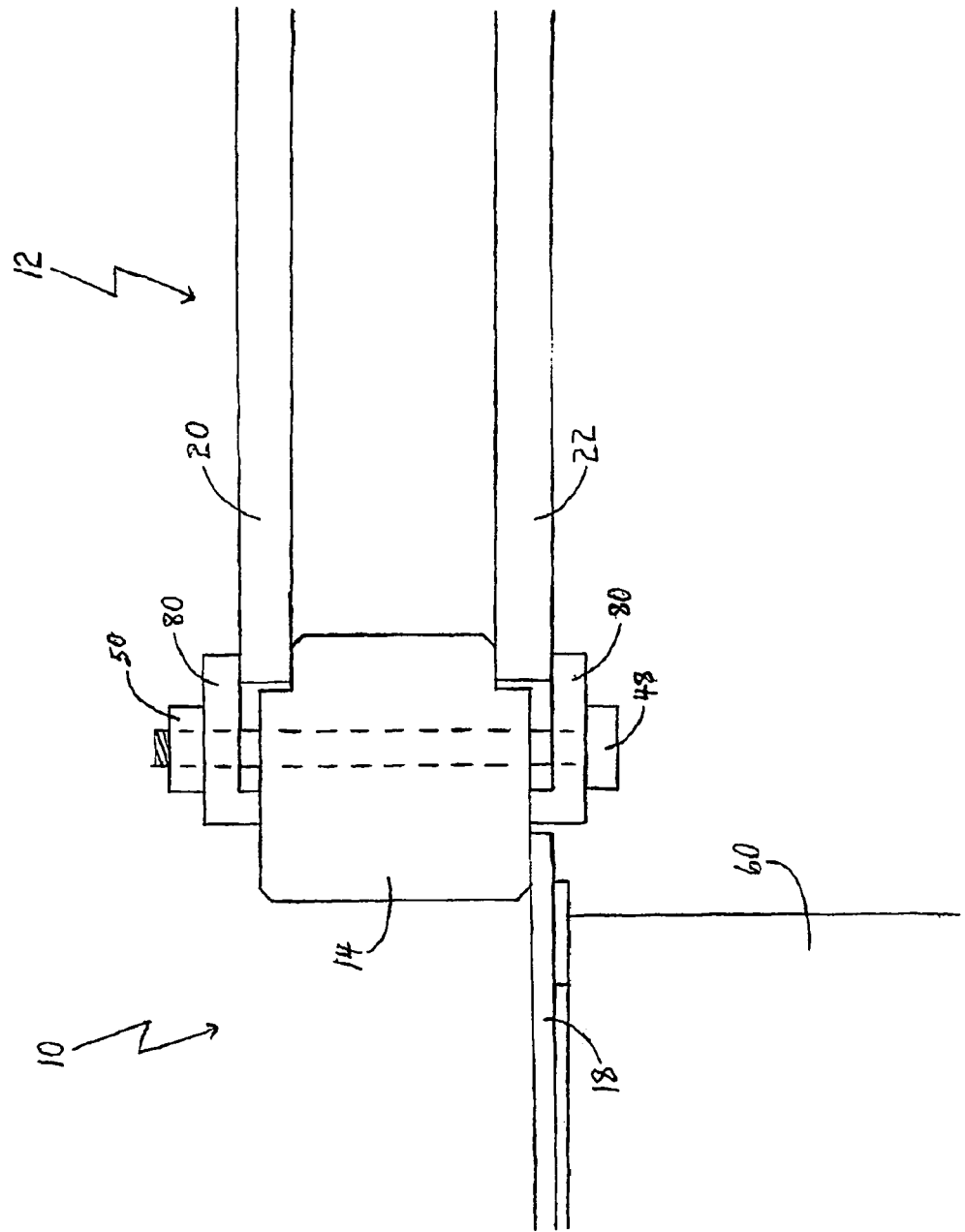

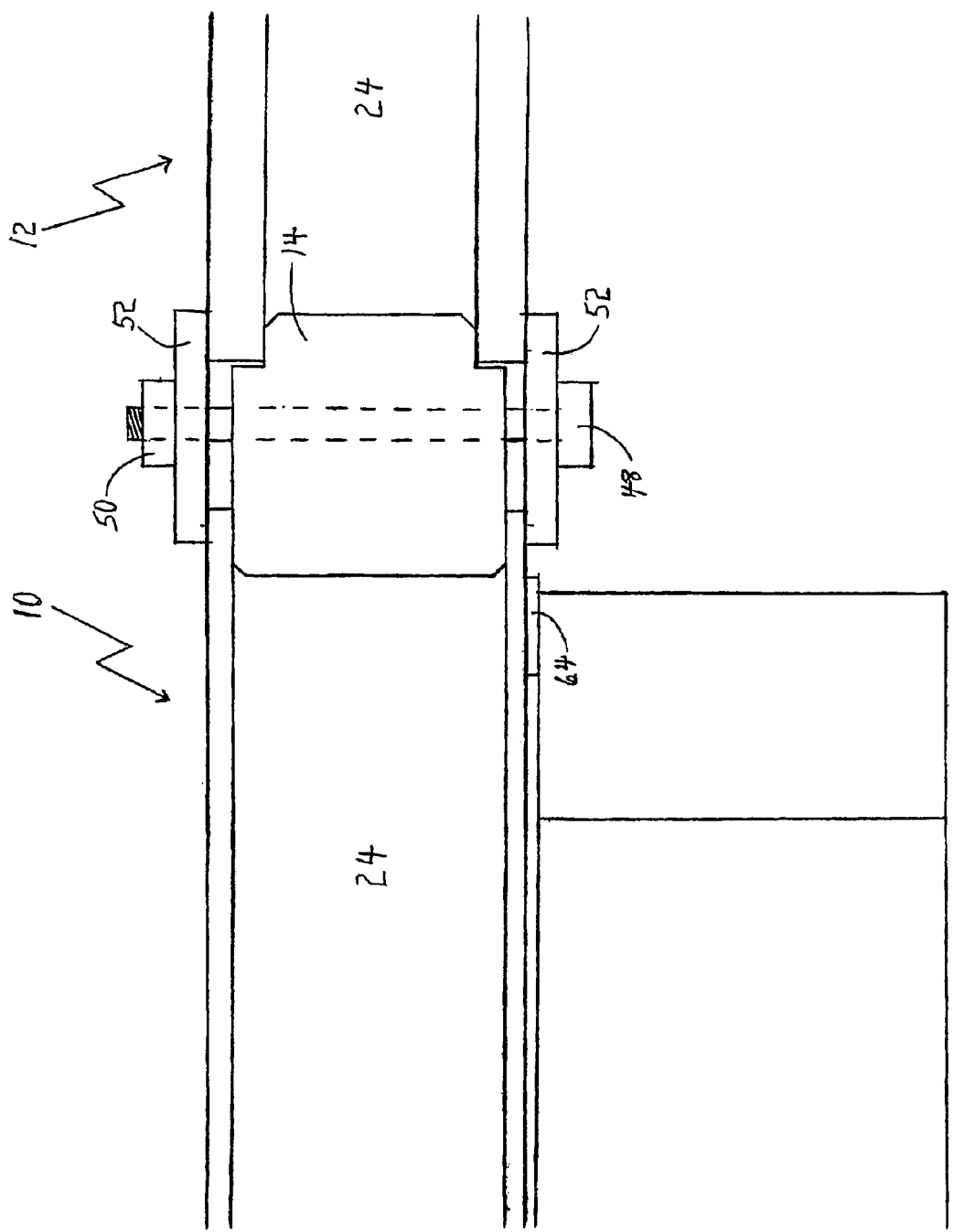
Fig. 15    Full scale.

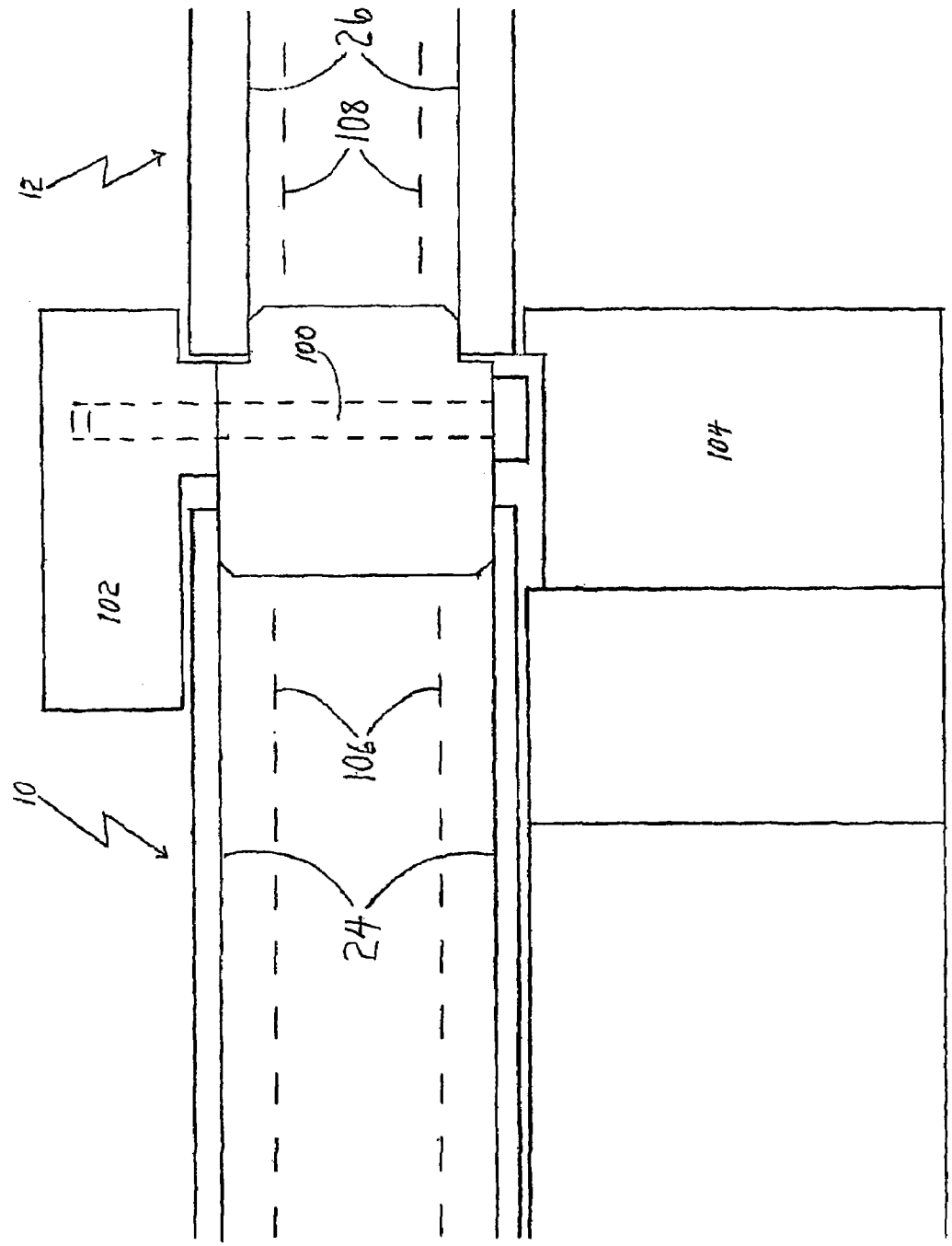
Fig. 16   Full scale.

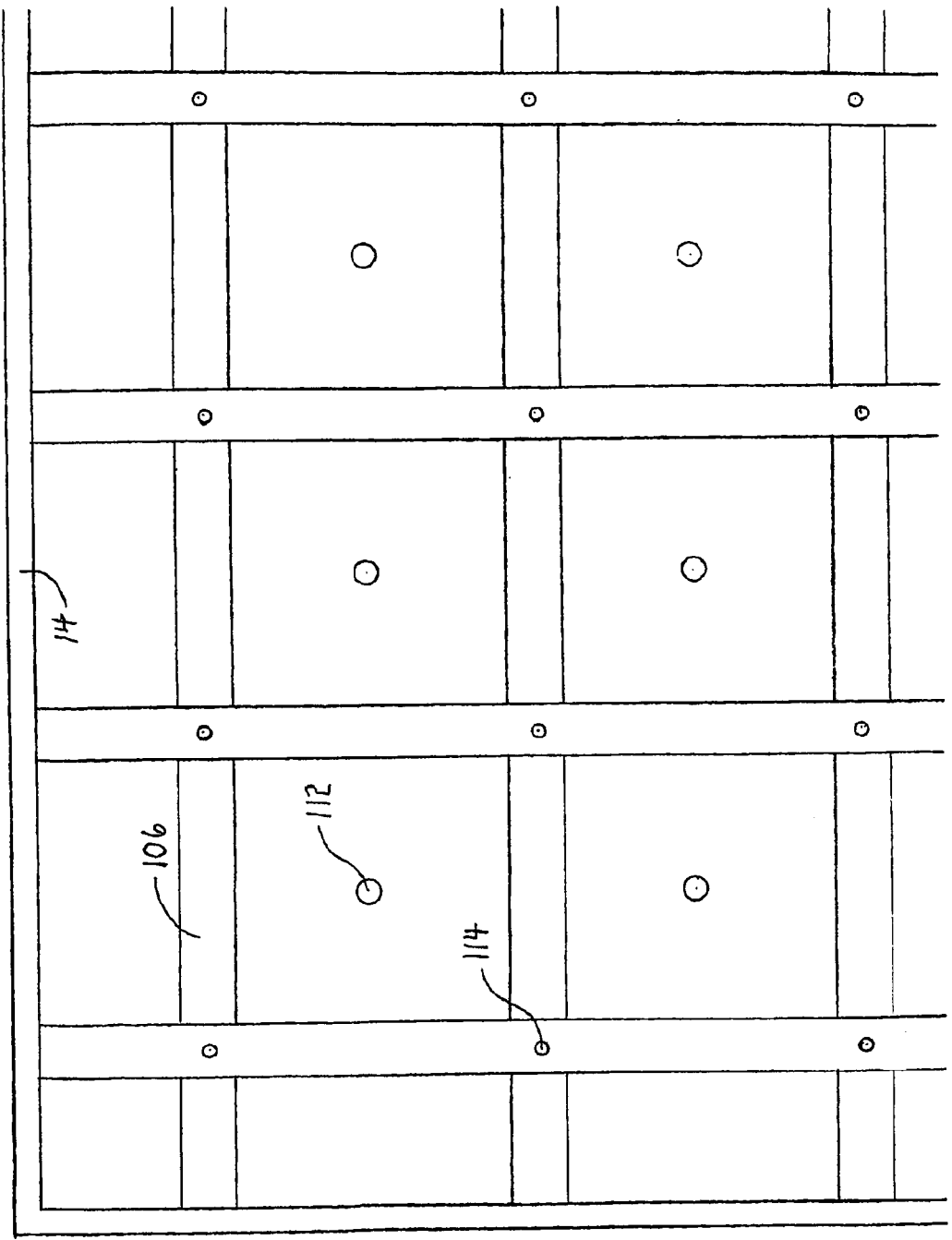
Fig. 17  Scale: 1 = 10.

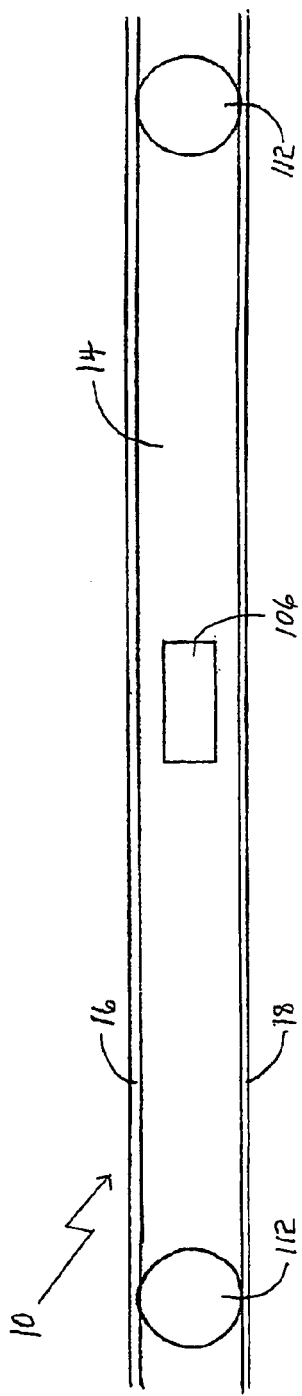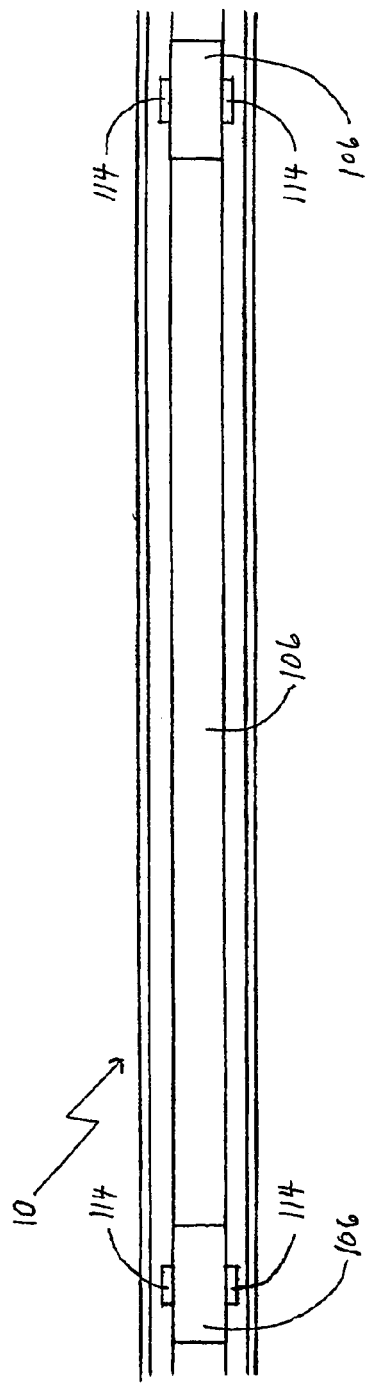
Fig. 18a  Scale: 1 = 3.
Fig. 18b  Scale: 1 = 3.

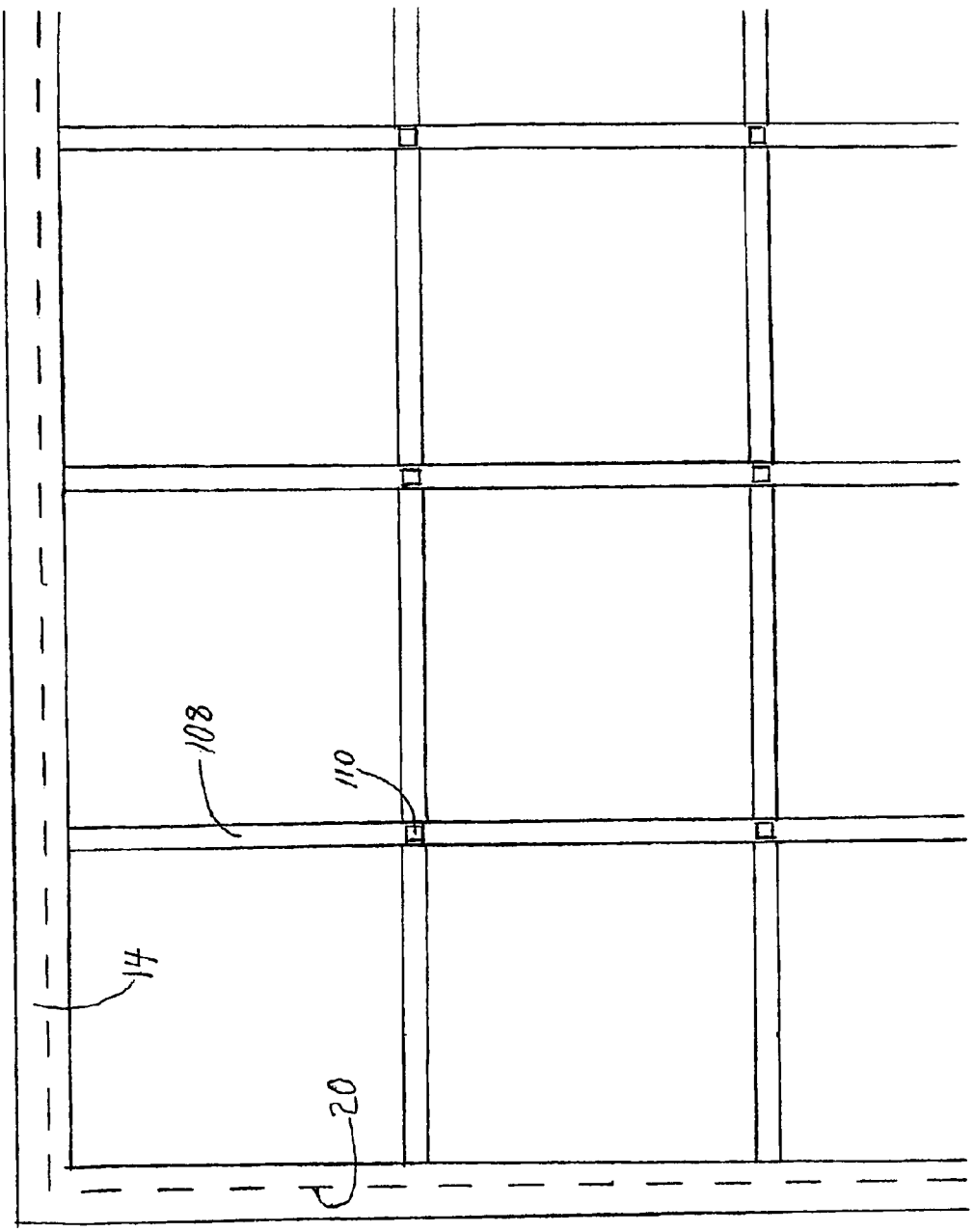

Fig. 20   Scale: 1 = 2.
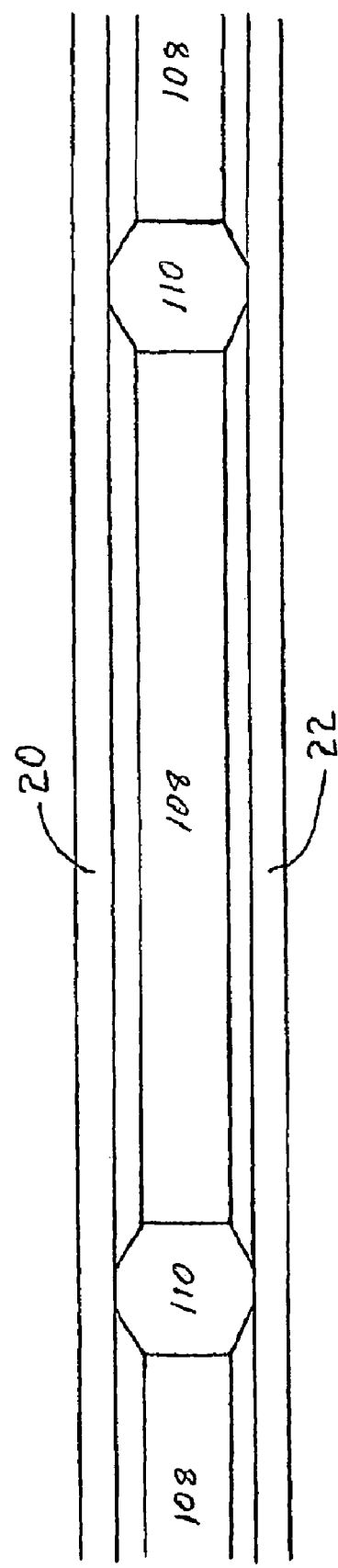

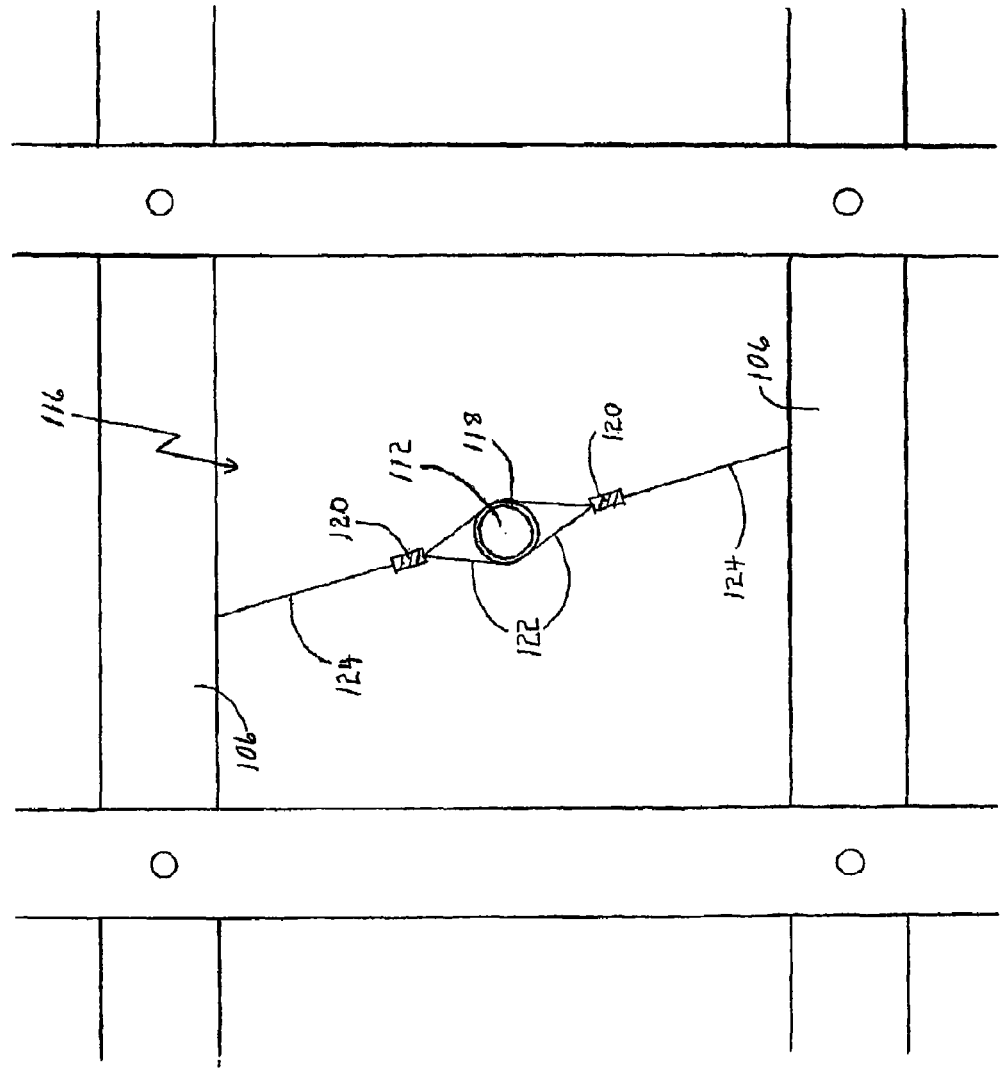
Fig. 21  Scale: 1 = 5.

VACUUM INSULATED BUILDING PANEL

BACKGROUND OF THE INVENTION

Early experimentation with vacuum insulated panels is evidenced in U.S. Pat. No. 948,541 (Coleman 1910). Later examples include U.S. Pat. No. 2,104,500 (Van Buren 1938) and U.S. Pat. No. 5,165,674 (Molthen 1992). Patent searches conducted by personnel at the Alberta Research Council and the University of Alberta, and another by a registered patent agent, yielded little that bore any similarity to the present panel. A vacuum is known to be the best nonconductor of heat, but it has not been successfully adapted to provide insulation in buildings.

Vacuum insulated building panels have generally consisted of an enclosed space in which a combination of insulating material and a partial vacuum impedes, heat transfer between the interior and exterior faces of such panels, the size of such panels being small, fitting between studs or covering, at most, an inside wall of a room. The faces and sides of these panels are rigidly constructed, either in one piece or the faces are secured by glue or other permanent means to a frame that forms the sides of the panel. Within the enclosed space, a separate structure supports the inside of the faces and sides of the panel to prevent inward collapse of the panel due to suction pressure of the vacuum.

The weather exposed face of a rigidly constructed panel expands and contracts due to wide temperature variations while the size of the other face changes little in comparison due to being maintained at close to building temperature. The panel warps, alternately in one direction then the other depending on the direction on temperature change, rendering it unusable.

A second previously unresolved problem caused by expansion and contraction of one face of a panel but not the other stresses the rigidly constructed support structures in other panels, said structures preventing the implosion of panel's due to vacuum pressure by maintaining the separation of their faces. Under vacuum, support structures are continuously forced to adjust position relative to the expanding or contracting face of the panel, an exercise for which they are not designed.

The above problems do not exist in the present panel.

SPECIFICATION

Preliminary:

These panels are narrow in depth but unlimited in other directions, a single panel usually covering each plane surface on the outside of a house or other building. Above ground level they will cover walls, roofs, window openings and door openings. Panels may also line the inside of walls below ground level and underlie ground floors although there is little need for the latter in other than frigid zones.

The parts that enclose the vacuum in these panels are an exterior plate, an interior plate, and a post frame that separates the plates at their outer edges. The preferred material of plates in all but window panels is steel sheeting, that of window panels being glass. The material of post frames may be plastic or wood. The plates overlap the inner edges of the post frame; they are not attached to the post frame by any permanent means such as glue or screws. The post frame and plates are held to each other at a single location in each panel, referred to herein as an "anchor point", by means of a bolt, the purpose of which is to maintain the relative positions of post frame and plates to each other. The plates and post frame of each panel abutting the footing of a building have their anchor point at about midpoint of the bottom post of its post frame; panels covering roofs are anchored to the building frame and their post frames and plates are held together by bolts at the centers of flat roofs or at midpoint of peak lines. The post frames of adjoining panels are constructed in a contiguous manner whereby a single modified post serves both such adjoining panels; the contiguous post frame structure is erected slightly away from the building frame to accommodate contraction of that structure in cold weather. At such times as panels are not under vacuum, wall and window panels are held in place by exterior framework components and exterior window frames, respectively, which are attached to post frames.

Within the vacuum chamber of each panel, a support structure counters the vacuum pressure that would otherwise cause the panel to implode. The support structure in steel plated panels consists of a lattice framework that supports the post frame and of spheres that maintain separation of plates. The lattice framework is made up of equally spaced cross members that form squares, in the centers of which the spheres are positioned. In window panels, separation of cross members is approximately halved, and in lieu of spheres, cross members thicken at their intersections to make contact with the glass plates. The material of support structures is the same as that of post frames so that a problem of expansion differential does not arise.

The vacuum chambers of all panels above ground level are interconnected by means of air passages through shared posts, forming in effect a single vacuum. Vacuum is thereby established in all panels simultaneously. Ports in interior plates of steel plated panels provide access to a vacuum pump which activates automatically when needed to maintain desired pressure.

The most important feature of this panel is the elimination of the cause or warping. This is achieved by using the suction pressure of the vacuum as the sole means of attachment between plates and post frame, thus replacing the one piece construction or permanent physical attachment of parts of other panels. A bond that rivals the strength of the materials involved is created when vacuum is applied, while at the same time, lateral movement of a thermally expanding or contracting plate in relation to the post frame occurs without significant resistance.

A secondary feature of this panel is the use of spheres as spacers to maintain separation of plates in steel plated panels. The spheres roll without resistance to accommodate any movement of one plate in relation to the other. Unlike other panels, this panel recognizes problems caused by thermally induced expansion and contraction of weather exposed plates, and provides remedies.

BRIEF DESCRIPTIONS OF THE DRAWINGS

Drawings are for the purpose of illustration only and are not intended to in any way limit the scope of the invention to the particular embodiments shown, whereas:

FIG. 2 is a front view or the vacuum insulated panel illustrated in FIG. 1 showing the four corners in section.

FIG. 3 is a side elevation view, in section, of the vacuum insulated panel illustrated in FIG. 1.

FIG. 4 is a side elevation view, in section, showing the configuration of the vacuum insulated panel illustrated in FIG. 1 where it abuts the footing, prior to creating vacuum.

FIG. 5 is the side elevation view shown in FIG. 4, showing the modified configuration after vacuum has been created.

FIG. 6 is a top plan view, in section, showing the configuration of two of the vacuum insulated panels illustrated in FIG. 1 at an in-turning corner of a building, prior to creating vacuum.

FIG. 7 is the top plan view shown in FIG. 6, showing the modified configuration after vacuum has been created.

FIG. 8 is a top plan view, in section, showing the configuration of two of the vacuum insulated panels illustrated in FIG. 1 at an out-turning corner of a building, prior to creating vacuum.

FIG. 9 is the top plan view shown in FIG. 8, showing the modified configuration after vacuum has been created.

FIG. 10 is a side elevation view, in section, showing the configuration of two of the panels illustrated in FIG. 1 where they abut at an eave, prior to creating vacuum.

FIG. 11 is the side elevation view shown in FIG. 10, showing the modified configuration after vacuum has been created.

FIG. 12 is a side elevation view, in section, showing the configuration of two of the vacuum insulated panels illustrated in FIG. 1 where they abut on a flat roof.

FIG. 13 is a side elevation view, in section, showing the configuration of two of the vacuum insulated panels illustrated in FIG. 1 where they abut on a peaked roof.

FIG. 14 is a top plan view, in section, showing the configuration where a preassembled panel covering a window opening is placed in position abutting a partly assembled wall panel in the initial stage of its incorporation into the wall panel.

FIG. 15 is the top plan view shown in FIG. 14, illustrating the modified configuration after the window panel has been fully incorporated into the wall panel but prior to vacuum being created.

FIG. 16 is the top plan view shown in FIGS. 14 and 15, illustrating the modified configuration after vacuum has been created.

FIG. 17 is a front elevation view, in section, of the vacuum insulated panel illustrated in FIG. 1, showing the support structure within the vacuum chamber of a steel plated panel.

Figure 1:
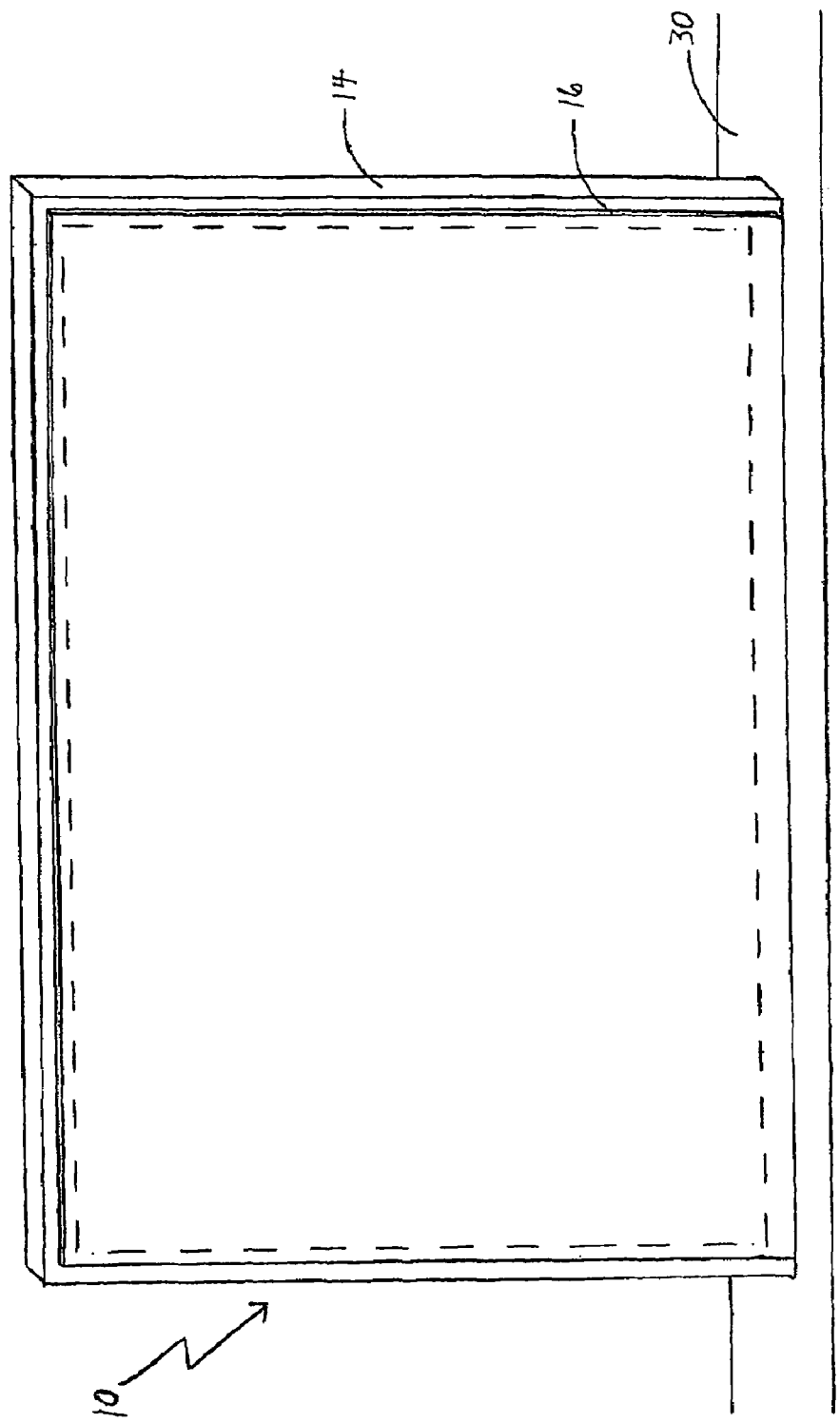
FIG. 1 is a perspective view of a vacuum insulated panel constructed in accordance with the teachings of the present invention.

FIG. 18*a* shows, in section, a cross sectional view of parts of the support structure within the vacuum chamber of a steel plated vacuum insulated panel as illustrated in FIG. 1 which includes two spheres and a cross member of the lattice framework.

FIG. 18*b* illustrates a cross sectional view, in section, of intersecting cross members of the lattice framework within the vacuum chamber of the steel plated vacuum insulated panel shown in FIG. 18*a*.

FIG. 19 is a front view of a vacuum insulated panel covering a window opening showing the support structure within the vacuum chamber of a glass plated panel.

FIG. 20 is a cross sectional view of a vacuum insulated panel covering a window opening showing two intersections of cross members of the lattice framework which forms the support structure within the vacuum chamber of a glass plated panel.

FIG. 21 illustrates a sling that holds each sphere in a steel plated panel in its correct location when the panel is not under vacuum and permits the sphere to roll when the panel is under vacuum.

DETAILED DESCRIPTION OF THE PREFERRED EMBODIMENT

Introductory:

It would seem that a building panel fitted to the exterior of a building and using a vacuum as its insulating medium has not been successfully developed because of warping. While a vacuum is known to be the best of all insulators against conductive heat transfer, it must be contained in a stable structure in order to be practical. Warping, alternately in one direction then the other, occurs when the weather exposed face of a rigidly constructed panel expands and contracts in response to fluctuating outside temperatures while the interior face retains its shape due to being maintained at a constant temperature.

In this panel, in which the parts that enclose the vacuum consist of a post frame that separates two parallel plates at their edges, the problem of warping is eliminated by using the suction pressure of the vacuum as the sole means of attachment between said parts. This permits the expanding or contracting weather exposed plate to slide over the abutting surface of the post frame without forcing an accompanying movement of said post frame. There is no threat to the structural integrity of the panel which would otherwise cause the panel to warp or fracture, the bond between post frame and plates remaining unaffected and secure.

Interior parts of the panel consist of a support structure which counters the implosive pressure of the vacuum on the plates and on the frame. In other panels, a rigid support structure is stressed by any movement of one plate relative to the other, more severely the higher the degree of vacuum. In this panel there is no such stress. Plate separation is maintained by spacers in the form of spheres that roll with any movement of one plate in relation to the other.

In Detail:

There are two kinds of vacuum insulated panel, both operating in the same manner but one having glass plates to cover window openings and the other having steel plates to cover all other areas on the outside of a building. Other differences relate to their respective support structures, necessitated by the difference in strength of their plate materials. Panels may be referred to hereinafter according to their locations on the building, such as wall panels, roof panels or window panels. It should be understood that other suitable materials may be used other than steel and glass in plates. In the drawings, steel and glass plates are given separate reference characters.

The perspective view shown in FIG. 1 shows a wall panel 10 in position on a footing 30, not restricted in width or height as indicated by the scale of the drawing, the broken lines indicating the inner edges of the post frame 14 which is partly covered by exterior steel plate 16. The straight sections of the post frame, referred to as posts, are 5 cms. in both width and depth except where the post is modified in shape in order to serve two adjoining panels. Steel plates, exterior and interior, are about 3 mms. thick.

The full scale drawing in FIG. 2 of the wall panel 10 illustrated in FIG. 1, shows only the corners of the panel, the exterior plate 16 covering the inner edges of the post frame 14 and extending to the footing 30. The posts of the post frame are attached to each other at their ends in an airtight manner.

FIG. 3, a side elevation view, in section, of the panel illustrated in FIG. 1, shows exterior plate 16 and interior plate 18 overlapping the top post of post frame 14, the enclosed area below said post and between the said plates being the vacuum chamber 24.

It is intended that all panels above ground level in a building be integrated into a single structure whereby a single post serves both panels wherever two panels adjoin. Because of this unified construction and the exposure of post frames to varying temperatures causing small expansions and contractions of the integrated post frame structure, the latter is erected slightly away from the building frame in order to accommodate any thermally induced inward movement. Below ground level, where outward expansion of post frames cannot be accommodated, post frames are not integrated with those above ground level and are erected separately.

FIGS. 4 and 5, respectively, illustrate the differing configurations before and after creation of vacuum at midpoint of the bottom post of post frame 14 where a wall panel 10 abuts the footing 30, said location also being the anchor point of the panel where plates 16 and 18 and the post frame are held in fixed relative positions to each other.

Referring to FIG. 4, a clamping assembly consisting of bolt 48, nut 50 and two washers 52 holds the plates and post frame in close proximity to each other in preparation for creating vacuum. Lateral creeping of interior plate 18 is limited by the diameter of the opening for the bolt in said plate, and lateral creeping of exterior plate 16, in which the opening for the bolt is larger, is limited by a washer 54 that is placed in said opening to take up space not occupied by the bolt. Clamping assemblies are positioned at about one meter intervals along the bottom posts of wall panels.

The separation of the panel from the building frame 60 is shown in FIG. 4, facilitated by shims 62 as needed prior to vacuum being created, said shims being removed thereafter. The building frame features a steel beam 56 on its outside that extends along the footing, and a baseboard 58 on its inside which is removable for access to bolts. Circular openings are cut in the steel beam to accommodate the clamping assemblies.

Referring to FIG. 5, once vacuum has been created, clamping assemblies and washers 54 as illustrated in FIG. 4 are removed and replaced by bolt 28, nut 50 and exterior framework component 90. The outer framework component does not contact exterior plate 16 because of the difference in expansion factors.

Air passages through the modified posts of wall, roof and window panels interconnect the vacuum chambers of all such adjoining panels, enabling vacuum to be created in all such panels simultaneously. A vacuum pump, connected by means of a pipe grid that leads to access ports as needed through the interior plates of steel plated panels, is activated manually to create vacuum, and activates automatically thereafter to maintain desired pressure in the event of leakage.

FIGS. 6 and 7 both show the same view of two integrated panels at an in-turning corner of a building, FIG. 6 showing the configuration preparatory to creating vacuum, and FIG. 7 showing the modified configuration after vacuum is created.

In FIG. 6, bolts 32, spaced at approximately one meter intervals along the modified post of post frame 14, and exterior framework component 36, assisted by clamping assembly bracer 34 and shims 62, compress the edges of interior plates 18 and exterior plates 16 of both panels 10 against the modified post so that upon first removal of air from the panels, the plates immediately bond to said modified post. Also shown in this drawing is steel pillar 66, part of building frame 60, through which circular openings, indicated by broken lines, are cut to provide access to bolts. On the inside of the building frame, cornerpiece 67 is removable to access bolts. Shims 62 are in place, separating the panels from the building frame.

Referring now to FIG. 7, after vacuum, has been created, all shims 62 and shims 64 at in-turning corners of the building, as shown in FIG. 6, are removed and all bolts 32 are tightened so that all exterior framework components 36 are brought into contact with their respective post frames as shown in FIG. 7. Also shown in this drawing is an air passage 68 connecting the vacuum chambers of the two panels 10, but not positioned in conflict with a bolt as shown. Exterior framework component 36 holds exterior plates 16 in position at such times as vacuum is lost or released, as do other exterior framework components under eaves above footings, and vertically at out-turning corners of buildings.

FIGS. 8 and 9, respectively, show the configurations at an out-turning corner of a building before and after vacuum is created. Shapes of most parts are necessarily quite different from those at in-turning corners but the performance of these modified parts, which include the post of post frame 14, an exterior framework component 74, clamping assembly bolt 70, replacement bolts 72, clamping assembly bracer 76 and building frame pillar 78, remain unchanged. Prior to creating vacuum, shims 64 maintain the separation of panels from the building frame and shims 62 assist in compressing exterior plates 16 to the post frame, all shims being removed after vacuum has been created. The clamping assembly bracers compress interior plates 18 to the post frame prior to creating vacuum and are removed after vacuum is created, unlike the bracers at in-turning corners which remain in position.

At an eave, FIGS. 10 and 11, respectively, show the configuration of adjoining wall and roof panels 10 before and after creating vacuum. The shape of the modified post of post frame 14 is dictated by the angle of the roof slope. In FIG. 10, the clamping assemblies, which are spaced at about one meter intervals along the modified post of post frame 14, consist of bolts 48, nuts 50 and washers 80 which are the same as those used at the footing except that washers are modified in order to make contact with the post frames. In FIG. 11, the clamping assembly shown in FIG. 10 has been replaced by bolt 28, nut 50 and exterior framework component 84, the latter not making contact with exterior plate 16 because of differing expansion factors. Openings out in steel beam 82 and a sufficiently deep attic space above ceilings provide access to bolts. Shim 64 are removed after vacuum is created.

FIG. 12 depicts the configuration whereby two adjoining panels 10 combine to cover a flat roof. The two panels share an unmodified post 14 of the integrated post frame structure at their juncture, and the abutting edges of both the exterior plates 16 and interior plates 18 are welded to each other. An exterior framework component 88 covers the welded edges of the two exterior plates and a steel girder 86, part of building frame 60, underlies the welded edges of the two interior plates. A bolt 92, passing through the exterior framework component, the shared post of the two panels, the welded edges of the exterior and interior plates and the steel girder, anchors all said parts to the building frame.

FIG. 13 illustrates the configuration of two adjoining panels 10 at the peak of two sloping roof sections. Exterior plates 16 and interior plates 18 of the two panels are welded together at their abutting edges, old bolt 94 anchors exterior framework component 96, post frame 14, and the said plates to steel girder 98 which is part of building frame 60.

Three stages in the erection of window panels are shown in FIGS. 14, 15 and 16. Glass plated window panels are incorporated within steel plated wall panels, such wall panels being referred to as host panels. The posts of post frames shared by window panels and their host wall panels are not linked to the unified post frame structure of steel plated wall and roof panels. One or more air passages, as needed, through each post of post frames that is shared by two steel plated panels connects the vacuum chambers of such panels so that in effect, the vacuums in all such interconnected panels form a single vacuum, but each window panel is interconnected with its host panel by means of a single air passage through the bottom horizontal post of its post frame. This, by a certain means, permits a lesser degree of vacuum to be established in glass plated window panels than in steel plated panels.

FIG. 14 shows, in section, a post 14 of a fully assembled glass plated window panel 12 being fitted into a prepared opening in interior plate 18 of its host steel plated wall panel 10, the interior plate having been installed in its permanent position in relation to building frame 60. The said post is slightly modified to accommodate the thicker exterior plate 20 and interior plate 22 of the window panel. The clamping assembly shown, consisting of bolt 48, nut 50 and washers 80, serves until the host wall panel has been fully assembled.

FIG. 15 shows the configuration in which a fully assembled wall panel 10 adjoins a window panel 12 preparatory to creating vacuum. The clamping assembly washers 80, shown in FIG. 14, have been replaced by clamping assembly washers 52.

By way of introducing the support structures that prevent implosion of panels due to vacuum pressure, the support structure in a steel plated panel consists of a lattice framework which supports the post frame against vacuum pressure and of spacers in the form of, and herein referred to as, spheres which maintain the separation of exterior and interior plates against said vacuum pressure. Due to the comparative strengths of steel and glass plate materials, anticipated separation of cross members in steel and glass plated panels is 60 cms. and 30 cms., respectively. Spheres are suspended in slings at the centers of squares formed by cross members in steel plated panels. In glass plated panels, spheres are not used to maintain plate separation. Instead, the cross members of support structures thicken at their intersections to make contact with plates, thereby maintaining separation of said plates. Projections from the lattice framework in steel plated panels at intersections of cross members maintain the position of said framework near the center of the vacuum chamber.

FIG. 16 shows the configuration where a window panel and its host wall panel adjoin after vacuum has been created. The clamping assembly shown in FIG. 15, consisting of bolt 48, nut 50 and washers 52, is replaced by bolt 100 and outer window frame 102. Shims 64 are removed and interior window casing 104, which is removable to access bolts, is added. Also shown in this drawing, indicated by broken lines, are a cross member of the lattice framework 106 within the vacuum chamber 24 of the host wall panel 10 and a cross member of the lattice framework 108 within the vacuum chamber 26 of the window panel 12.

On a scale of 1=10, FIG. 17 illustrates, in section, a support structure within the vacuum chamber of a steel plated panel. Cross members of the lattice framework 106 form squares or near squares, in the centers of which spheres 112 are suspended between cross members of the lattice framework in a manner that permits them to roll with thermally induced movement of one plate in relation to the other after vacuum is applied. Projections 114 protrude from each side of cross members at their intersections.

On a scale of 1=3, FIG. 18a illustrates, in section, a cross section of a steel plated panel 10 showing exterior plate 16, interior plate 18, vacuum chamber 14, two spheres 112, and a cross member 106 of the lattice framework.

On a scale of 1=3, FIG. 18b illustrates, in section, a cross sectional view of the same panel as that in FIG. 18a but at a location that shows the two projections 112 on each of two cross members 106, and also shows a third cross member 106 that attaches at right angles to and extends between the two first mentioned cross members.

On a scale of 1=5, FIG. 19 shows, in section, the support structure within the vacuum chamber of a glass plated window panel, the broken lines indicating the outer edges of exterior glass plate 20. The small squares at intersections of cross members 108 represent the thickened portions 110 of said cross members that make contact with and maintain the separation of exterior and interior plates.

On a scale of 1=2, FIG. 20 illustrates a side view of sections of a cross member of the lattice framework 108 in a window panel. Also shown are the thickened portions 110 of two intersecting cross members which maintain the separation of exterior and interior glass plates 20 and 22 respectively.

On a scale of 1=5, FIG. 21 illustrates a sling 116 which holds each sphere in a steel plated panel in its correct location at such times as the panel is not under vacuum, the sling consisting of a girdle 118 that loosely encircles the sphere so that the sphere can roll without impediment, two lengths of cord 122 that loop around the girdle and lead in opposite directions to coil springs 120, and second lengths of cord 124 that connect the coil springs to cross members of the lattice framework 106, the said opposite directions lining up with the anchor point of the panel. When the panel is under vacuum, the slings allow the spheres to roll with any thermally induced contraction or expansion of one plate in relation to the other plate.

Other Details:

The means by which a lesser degree of vacuum pressure can be established in window panels than in their host panels is as follows. When desired pressure is attained in window panels, a steel ball is moved by magnet to plug the air passage through its bottom post. Renewed operation of the vacuum pump creates greater pressure in the host panel, firmly seating the steel ball in the top of the air passage, and preventing further increase in pressure in the window panel.

It should be noted that while glass plated panels will not insulate against solar heating, they will perform as well as steel plated panels against conductive heat transfer.

The vacuum chambers of all steel plated panels are connected either directly or indirectly via air passages between adjacent panels to a vacuum pump by means or ports through interior plates and a pipe grid. If vacuum is lost or released for any reason, accidental or intentional, the procedure will be to apply clamping assemblies as needed along all edges of panels, effect needed repairs or servicing, then recreate vacuum, after which clamping assemblies are removed or adjusted as required.

In the event or loss of vacuum in a window panel due to a fractured plate, the plugged air passage to the host panel will prevent loss of vacuum in the rest of the integrated system. When the fractured plate has been replaced, vacuum in the rest of the system will need to be released, then renewed throughout. Insulation in the rest of the system will have been retained while awaiting repair.

In preparation for creating or recreating vacuum, whether during construction or after vacuum has been released or lost for any reason, all interior steel plates are separated from the building frame by shims, and all wall and window panel plates, exterior and interior, are held sufficiently close to their respective post frames by clamping assemblies in various configurations as needed at one meter intervals along their edges, thereby ensuring airtight couplings of all plates to post frames when vacuum is applied. In roof panels, if plates and post frames are not positioned in close enough proximity by the weight of their exterior plates, additional weight is applied temporarily. After vacuum has been created, shims are removed to give the integrated post frame room to contract in cold weather, added weights are removed from the roof, and clamping assemblies are modified, removed or replaced as necessary in order to permit plates to freely expand and contract in relation to post frames due to fluctuating outside temperatures. Changes in clamping assemblies after vacuum has been created include positioning of outer window frames and other exterior framework components.

The anticipated procedure for assembling window panels and incorporating them into well panels is as follows:

The glass exterior plate will be laid out above a work bench or other flat surface, elevated to later accommodate clamping assemblies;

the post frame will be positioned on the plate, overlapping the edges of said plate;

vertical cross members of the lattice framework, then horizontal sections of same that fit between the vertical cross members, attached in fixed positions, will follow;

the interior plate, which is identical to the exterior plate, will then be positioned, over-lapping the post frame;

clamping assemblies will be temporarily installed to hold plates to the post frame until vacuum has been created;

the fully assembled window panel will be installed in its permanent position, resting on vertical cross members of the lattice framework of its host panel which will have been erected to window level, and upon such installation, the window panel will be held in position by replacing interior washers 80 with washers 52;

the remainder of the lattice framework in the host panel will then be erected;

spheres will be positioned in the squares formed by cross members of the lattice framework of the host wall panel;

the exterior plate of the host wall panel will be positioned and secured by clamping assemblies along its outer edges, and on the outside of the window panel post frame, washers 80 will be replaced by washers 52; and upon creation of vacuum, clamping assemblies along the perimeters of window panels are replaced by bolts 100 and outer window frames 102.

Exterior framework components, which include outer window frames, follow the edges of all exterior plates of wall and window panels, their main purpose being to prevent the collapse or said plates if vacuum is lost due to accident or released for servicing or repair. They also provide a degree of protection to edges or panels from weathering.

Clamping assemblies, in configurations as needed, are installed at one meter intervals along the edges or all wall and window panels, their purpose being to hold both exterior and interior plates in position against post frames preparatory to initially creating vacuum and to recreating vacuum after it has been lost or released for any reason. At building corners, exterior framework components form integral parts of clamping assemblies.

All plates, steel or glass, exterior or interior, are provided space to expand or contract due to temperature fluctuations.

Steel plated panels can be adapted for use in constructing doors, requiring flexible air conduits to connect their vacuum chambers to those of wall panels.

It should be understood that modifications may be made to the embodiments shown in drawings and to any and all aspects of this invention as they have been represented in descriptions herein.

Proposed Construction Agenda

1. A vacuum pump will be permanently installed in the building. A pipe grid, directly or indirectly connecting the vacuum pump to all steel plated panels will be laid out through the building frame, and ports, through which air will be withdrawn to create vacuum, will be positioned in interior steel plates.

2. Steel sheeting will be delivered to building sites in custom ordered transportable sections.

Sections of steel sheeting, handled by mobile crane, will be welded together on conveniently located jigs to form correctly sized interior plates.

3. Temporary shims will be attached to the building frame to provide adequate spacing between panels and the building frame above ground level to allow for any contraction of the integrated post frame in cold temperatures.

Below ground level, interior plates of separate panels, their post frames not integrated with those above ground levels will be positioned flush with, anchored to, and temporarily attached to the foundation wall.

4. When assembled, the interior plate of each wall panel, with its jig, will be raised into position by crane and temporarily attached to the building frame, after which; the jig will be lowered to the ground to await piecing together and erection of the exterior plate.

Interior plates of roof panels may be assembled and raised in a similar manner, or sections may be assembled in their permanent positions on the roof, completed plates being anchored at the center of the roof, their abutting edges being welded together.

5. With all steel interior plates in place, a unified post frame structure following and overlapping the outer edges of said plates above ground level will be erected and temporarily attached as needed to the building frame.

Below ground level, post frames following the outer edges of the interior plates of separate panels will also be erected, anchored, and temporarily attached to the building frame or foundation. Air passages connecting the vacuum chambers of each pair of adjoining panels will be drilled through their shared posts.

6. Once the integrated post frame structure of steel plated panels is in place, cross members of lattice frameworks along with fully assembled window panels are installed, beginning at bottom posts of wall panel post frames and working upwards. When the fully assembled window panels have been positioned within the openings left for them by; cross members, the interior washers of clamping assemblies positioned along the post frames of said window panels, an ex-ample of which is shown in FIG. 14, are replaced by the flat washers shown in FIG. 15 in order to hold the window panels in position against the steel interior plates of the wall panels.

The vacuum chamber of each window panel is connected to that of its host panel by means of a single air passage through its bottom post, and during assembly of said panel, a steel ball is placed in its vacuum chamber, later to be moved by magnet to plug the air passage when the desired degree of vacuum is reached during removal of air.

In all steel plated panels, spheres that maintain separation of plates are hung in slings or otherwise positioned at the centers of squares formed by cross members of the lattice framework in a manner that allows said spheres to roll with any thermally induced expansion or contraction of one plate in relation to the other plate.

7. When lattice frameworks and spheres have been installed in all steel plated panels, exterior steel plates will be pieced together on the same jigs used to assemble interior steel plates and raised into position against their respective post frames. Upon erection of steel exterior plates, clamping assembly washers on the outside perimeters of window panels, as exemplified in FIG. 14, will be replaced with flat washers as shown in FIG. 15 in preparation for creating vacuum, thereby holding exterior plates in position until such time as suction pressure of the vacuum serves that purpose.

Also upon erection of steel exterior plates, clamping assemblies will be positioned at one meter intervals along the bottom and top posts of wall panels.

Along the vertical posts of said wall panels at in-turning and out-turning building corners, differing means of compressing plates to post frames, as illustrated in FIGS. 6 and 8, respectively, will be utilized.

On flat or sloping roofs, added weights, if needed, will serve the same purpose as clamping assemblies.

Clamping means and added weights are intended to hold plates sufficiently close to post frames to ensure bonding of plates to post frames when vacuum is applied.

8. Upon activation of the vacuum pump, all plates should immediately bond with their respective post frames in an airtight manner; failure to do so would indicate inadequate clamping. If a lesser degree of vacuum is intended in glass plated panels than iii steel plated panels, the vacuum pump will be deactivated when the lesser degree is attained while steel balls in the vacuum chambers of window panels are moved by magnet to cover the tops of air passages to their host wall panels.

When the positioning of all steel balls has been achieved, reactivation of the vacuum pump will lock the steel balls in placer, preventing further increase in vacuum pressure in window panels while pressure is increased in steel plated panels. When desired pressure is achieved in steel plated panels, the vacuum pump will automatically deactivate, and automatically reactivate if pressure falls to a preset level due to leakage. Once vacuum is achieved, shims separating panels from the building frame are removed, and all clamping is replaced or modified as necessary in order to permit thermally induced movement of plates.

It should be understood that modifications may be made to the embodiments shown in drawings and to any and all aspects of this invention as they have been portrayed in the foregoing text.

PARTS LIST

10 Steel plated panel
12 Glass plated panel
14 Post frame or post
16 Steel exterior plate
18 Steel interior plate
20 Glass exterior plate
22 Glass interior plate
24 Vacuum chamber in a steel plated panel
26 Vacuum chamber in a glass plated panel
28 Bolt, attaching the exterior framework component abutting the footing to the post frame after vacuum has been created
30 Footing
32 Bolt, at an in-turning building corner
34 Bracer, at an in-turning building corner
36 Exterior framework component, at an in-turning building corner
38 Sling
40 Girdle
42 Coil spring
44 Cord, attaching girdle to coil spring
46 Cord, attaching coil spring to a cross member of the lattice framework
48 Bolt, part of a clamping assembly prior to creating vacuum
50 Nut, part of a clamping assembly
52 Washer, part of a clamping assembly above footing prior to creating vacuum and around perimeters of window panels after installation into wall panels
54 Washer, at the anchor point in a wall panel, preventing creeping of the exterior plate
56 Steel beam, part of the building frame, abutting the footing
58 Baseboard, removable to access bolts
60 Building frame
62 Shim, separating the exterior framework component and the steel exterior plate at a building corner prior to creating vacuum
64 Shim, separating a wall panel from the building frame prior to creating vacuum
66 Steel pillar, part of the building frame at an in-turning building corner
67 Cornerpiece, removable to access bolts
68 Air passage, connecting the vacuum chambers of two adjoining panels
70 Bolt, at an out-turning building corner prior to creating vacuum
72 Bolt, at an out-turning building corner after vacuum has been created
74 Exterior framework component at an out-turning building corner
76 Bracer, at an out-turning building corner
78 Steel pillar, part of the building frame at an out-turning building corner
80 Washer, part of a clamping assembly under an eave prior to creating vacuum and around the perimeter of a window panel before installation into a wall panel
82 Steel beam, part of the building frame under an eave
84 Exterior framework component under an eave
86 Steel girder, part of the building frame, at top of a bearing wall supporting a flat roof
88 Exterior framework component on a flat roof
90 Exterior framework component, covering the bottom edge of a well panel, abutting the footing
92 Bolt, anchoring roof panels to the building frame at midpoint of a flat roof
94 Bolt, anchoring roof panels to the building frame at midpoint of the peak line on a sloping roof
96 Exterior framework component, covering the peak line on a sloping roof
98 Steel girder, part or the building frame, at top of a bearing wall supporting a peak roof
0.00 Bolt, attaching an outer window frame to a window panel post frame
0.02 Outer window frame
0.04 Interior window casing
0.06 Lattice framework or cross member of same, within the vacuum chamber of a steel plated panel
0.08 Lattice framework or cross member of same, within the vacuum chamber of a glass plated panel
0.10 Thickened portion of a cross member in a glass plated panel
0.12 Sphere, separating the plates in a steel plated panel
0.14 Projection, at an intersection of cross members of the lattice framework in a steel plated panel The embodiments of the invention in which an exclusive property or privilege is claimed are defined as follows:

1. A vacuum insulated building panel comprising:
(a) an exterior plate having perimeter edges, and an identical interior plate having perimeter edges, said exterior and interior plates being juxtaposed to each other and separated at their perimeter edges by a post frame comprising a plurality of post members, thereby forming a vacuum chamber defined by the exterior and interior plates and said post frame;
(b) bolt means connecting the exterior and interior plates to the post frame at a selected anchor point along the perimeter of the building panel;
(c) a lattice frame disposed within the vacuum chamber and comprising a network of cross members, said cross members Forming a plurality of quadrangular sub-chambers within the vacuum chamber; and (d) disposed centrally within each of one or more of said sub-chambers, a spherical spacer having a diameter corresponding to the thickness of the post frame;

wherein:

(e) air may be partially evacuated from the vacuum chamber to create a vacuum therein, and thus biasing the exterior and interior plates toward each other, with their perimeter edges contacting the post frame, and with separation of middle regions of the plates maintained by the spherical spacers;

(f) the vacuum within the vacuum chamber provides the sole means for maintaining the perimeter edges of the exterior and interior plates in airtight sealing contact against the post frame, thereby permitting in-plane thermally-induced movement of either plate relative to the post frame without impairing the airtightness of the vacuum chamber; and (g) each spherical spacer is contained in a sling that holds it in position when the building panel is not under vacuum, while permitting it to roll within its sub-chamber in response to thermally-induced relative movement between the inner and outer plates when the building panel is under vacuum, said sling comprising girdle means which loosely encircles the spherical spacer without preventing the spherical spacer from rolling, said sling being connected to the lattice frame by a pair of elongate tics extending in opposite directions away from the girdle means, said ties incorporating tensioning means, and. said opposite directions being in substantially alignment with the anchor point of the building panel;

whereby warping due to differential expansion or contraction of the inner and outer plates when the building panel is under vacuum is prevented by the inner and outer plates' ability to slide relative to the post frame.

2. A vacuum-insulated building panel in claim 1 wherein the post members are made from a material comprising wood.

3. A vacuum-insulated building panel as in claim 1 wherein the post member are made from a material comprising plastic.

4. A. vacuum-insulated building panel as in claim 1 wherein the post frame is quadrangular in shape.

5. A vacuum-insulated building panel as in claim 1 wherein at least one of the ties comprises cord.

6. A vacuum-insulated building panel as in claim 1 wherein at least one of the ties comprises wire.

7. A vacuum-insulated building panel as in claim 1 wherein the tensioning means comprises a coil spring.

8. An assembly of two or more vacuum-insulated building panels as defined in claim 1, wherein:

(a) the, building panels are erected above ground level in association with a building frame;

(b) the post frames of the building panels are erected in a contiguous manner, with each two adjoining panels being served by a single post; and (c) temperature-induced contraction of the overall post frame structure of the building panel assembly is accommodated by erecting the building panels spaced away from the building frame, and unattached to the building frame except at a single location on the roof of the building.

* * * * *